(12) United States Patent
Manolakos et al.

(10) Patent No.: US 12,724,105 B2
(45) Date of Patent: Sep. 1, 2026

(54) COMMON BATCH MODE REPORTING FRAMEWORK

(71) Applicant: QUALCOMM INCORPORATED, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 18/549,040

(22) PCT Filed: Apr. 5, 2022

(86) PCT No.: PCT/US2022/023435

§ 371 (c)(1),
(2) Date: Sep. 5, 2023

(87) PCT Pub. No.: WO2022/235362

PCT Pub. Date: Nov. 10, 2022

(65) Prior Publication Data

US 2024/0168122 A1 May 23, 2024

(30) Foreign Application Priority Data

May 5, 2021 (GR) .............................. 20210100303

(51) Int. Cl.
*G01S 5/00* (2006.01)
*H04W 24/10* (2009.01)

(52) U.S. Cl.
CPC .......... *G01S 5/0063* (2013.01); *G01S 5/0036* (2013.01); *H04W 24/10* (2013.01)

(58) Field of Classification Search
None
See application file for complete search history.

(56) References Cited

U.S. PATENT DOCUMENTS 10,334,554 B2 * 6/2019 Lee ........................ H04L 5/0098
2002/0019698 A1 2/2002 Vilppula et al.
(Continued)

FOREIGN PATENT DOCUMENTS

JP 2004502942 A 1/2004
WO WO-2020119727 A1 * 6/2020 ........... G01S 5/0236
WO WO-2020191646 A1 10/2020

OTHER PUBLICATIONS

CATT [RAN1]: "[Draft] LS on UE/TRP Tx/Rx Timing Errors", 3GPP Draft, R1-2102201, 3GPP TSG RAN WG1 Meeting #104e, 3rd Generation Partnership Project (3GPP), Mobile Competence Centre, 650, Route Des Lucioles, F-06921, Sophia-Antipolis Cedex, France, vol. RAN WG1, No. e-meeting, Jan. 25, 2021-Feb. 5, 2021, Feb. 8, 2021 (Feb. 8, 2021), XP051977763, 2 Pages.
(Continued)

*Primary Examiner* — Adolf Dsouza
(74) *Attorney, Agent, or Firm* — QUALCOMM Incorporated

(57) ABSTRACT

A batch measurement reporting method includes; receiving, at a wireless signaling device from a network entity, a batch request indicating a plurality of positioning methods; receiving, at the wireless signaling device, one or more PRS resources; measuring, at the wireless signaling device, one or more of the one or more PRS resources for each of the plurality of positioning methods in accordance with the batch request to determine, in combination, a plurality of PRS measurements; and transmitting, from the wireless signaling device to the network entity, a batch measurement report based on the plurality of PRS measurements and including a respective batch measurement sub-report for each of the plurality of positioning methods, each respective batch measurement sub-report comprising a respective batch of the plurality of PRS measurements.

48 Claims, 14 Drawing Sheets

(56) References Cited

U.S. PATENT DOCUMENTS

| | | | | |
|---|---|---|---|---|
| 2014/0295883 | A1* | 10/2014 | Kang .................... | G01S 5/0295 455/456.1 |
| 2016/0223641 | A1* | 8/2016 | Cheng .................. | G01S 5/0036 |
| 2017/0280280 | A1 | 9/2017 | Jain et al. | |
| 2021/0306895 | A1 | 9/2021 | Chen et al. | |

OTHER PUBLICATIONS

International Search Report and Written Opinion—PCT/US2022/023435—ISA/EPO—Oct. 12, 2022.

Qualcomm Incorporated: "Enhancements on Timing Error Mitigations for Improved Accuracy", 3GPP TSG RAN WG1 #104-e, R1-2101468, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-12, Jan. 19, 2021, XP051971633, Section 3.2 "Double Differential Positioning Methods—Elimination of both UE's and gNB unknow GDs", see also figure on p. 7, p. 6 - 9.

CATT: "Discussion on Accuracy Improvements by Mitigating UE Rx/Tx and/or gNB Rx/Tx Timing Delays", 3GPP TSG RAN WG1 Meeting #104b-e, R1-2102635, e-Meeting, Apr. 12-20, 2021, Apr. 7, 2021, pp. 1-21.

Qualcomm Incorporated: "Enhancements on Timing Error Mitigations for Improved Accuracy", 3GPP TSG RAN WG1 #104b-e, R1-2103170, e-Meeting, April 12 20 2021, Apr. 7, 2021, pp. 1-20.

* cited by examiner

900

```
CommonIEsRequestLocationInformation ::= SEQUENCE {
        locationInformationType LocationInformationType,
        triggeredReporting          TriggeredReportingCriteria     OPTIONAL,    -- Cond ECID
        periodicalReporting         PeriodicalReportingCriteria    OPTIONAL,    -- Need ON
        CommonBatchReporting        CommonBatchReportingCriteria   OPTIONAL,    -- Need ON
        additionalInformation       AdditionalInformation          OPTIONAL,    -- Need ON
910     qos                         QoS                            OPTIONAL,    -- Need ON
        environment                 Environment                    OPTIONAL,    -- Need ON
        locationCoordinateTypes     LocationCoordinateTypes        OPTIONAL,    -- Need ON
        velocityTypes               VelocityTypes                  OPTIONAL,    -- Need ON
        ...,
        [[
          messageSizeLimitNB-r14    MessageSizeLimitNB-r14         OPTIONAL     -- Need ON
        ]],
        [[
          segmentationInfo-r14  SegmentationInfo-r14          OPTIONAL     -- Need ON
        ]]
}
```

FIG. 9

COMMON BATCH MODE REPORTING FRAMEWORK

CROSS-REFERENCE TO RELATED APPLICATIONS

This application is the National Stage of International Application No. PCT/US2022/023435, filed Apr. 5, 2022, entitled "COMMON BATCH MODE REPORTING FRAMEWORK," which claims the benefit of Greek patent application No. 20210100303, filed May 5, 2021, entitled "COMMON BATCH MODE REPORTING FRAMEWORK," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data. Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example wireless signaling device includes: a transceiver; a memory; and a processor, communicatively coupled to the transceiver and the memory, configured to: receive, via the transceiver from a network entity, a batch request indicating a plurality of positioning methods: receive one or more PRS resources (positioning reference signal resources); measure one or more of the one or more PRS resources for each of the plurality of positioning methods in accordance with the batch request to determine, in combination, a plurality of PRS measurements; and transmit, via the transceiver to the network entity, a batch measurement report based on the plurality of PRS measurements and including a respective batch measurement sub-report for each of the plurality of positioning methods, each respective batch measurement sub-report comprising a respective batch of the plurality of PRS measurements.

Implementations of such a wireless signaling device may include one or more of the following features. The processor is configured to measure one or more of the one or more PRS resources in accordance with one or more respective positioning-method-specific configuration parameters for each of the plurality of positioning methods for which the one or more respective positioning-method-specific configuration parameters are included in the batch request. The batch request comprises one or more common batch configuration parameters, and the processor is configured to measure one or more of the one or more PRS resources in accordance with at least the one or more common batch configuration parameters, and the one or more common batch configuration parameters comprise a measurement window, or a first indication of the one or more PRS resources, or a second indication of one or more PRS instances of the one or more PRS resources, or a measurement periodicity, or any combination thereof. The batch request comprises one or more first common batch configuration parameters, and the processor is configured to measure one or more of the one or more PRS resources in accordance with at least the one or more first common batch configuration parameters, the plurality of positioning methods is a first plurality of positioning methods, the one or more PRS resources comprise one or more first PRS resources, the one or more first common batch configuration parameters include a first measurement window corresponding to the first plurality of positioning methods, the batch request comprises one or more second common batch configuration parameters corresponding to a second plurality of positioning methods and including a second measurement window, the second plurality of positioning methods being different from the first plurality of positioning methods, and the processor is configured to measure the one or more first PRS resources that arrive at the wireless signaling device during the first measurement window and to measure, in accordance with the one or more second common batch configuration parameters, one or more second PRS resources that arrive at the wireless signaling device during the second measurement window. The processor is configured to prioritize reporting a set of aligned PRS measurements, for different positioning methods, of the plurality of PRS measurements over a non-aligned PRS measurement of the plurality of PRS measurements. The processor is configured to prioritize reporting of the plurality of PRS measurements based on an order of the plurality of positioning methods indicated in the batch reporting request.

Another example wireless signaling device includes: means for receiving, from a network entity, a batch request indicating a plurality of positioning methods; means for receiving one or more PRS resources; means for measuring one or more of the one or more PRS resources for each of the plurality of positioning methods in accordance with the batch request to determine, in combination, a plurality of PRS measurements; and means for transmitting, to the network entity, a batch measurement report based on the plurality of PRS measurements and including a respective batch measurement sub-report for each of the plurality of positioning methods, each respective batch measurement sub-report comprising a respective batch of the plurality of PRS measurements.

Implementations of such a wireless signaling device may include one or more of the following features. The means for measuring one or more of the one or more PRS resources comprise means for measuring one or more of the one or more PRS resources in accordance with one or more respective positioning-method-specific configuration parameters for each of the plurality of positioning methods for which the one or more respective positioning-method-specific configuration parameters are included in the batch request. The batch request comprises one or more common batch configuration parameters, and the means for measuring one or more of the one or more PRS resources comprise means for measuring the one or more of the one or more PRS resources in accordance with at least the one or more common batch configuration parameters, and the one or more common batch configuration parameters comprise a measurement window, or a first indication of the one or more PRS resources, or a second indication of one or more PRS instances of the one or more PRS resources, or a measurement periodicity, or any combination thereof. The batch request comprises one or more first common batch configuration parameters, and the means for measuring one or more of the one or more PRS resources comprise means for measuring the one or more of the one or more PRS resources in accordance with at least the one or more first common batch configuration parameters, the plurality of positioning methods is a first plurality of positioning methods, the one or more PRS resources comprise one or more first PRS resources, the one or more first common batch configuration parameters include a first measurement window corresponding to the first plurality of positioning methods, the batch request comprises one or more second common batch configuration parameters corresponding to a second plurality of positioning methods and including a second measurement window, the second plurality of positioning methods being different from the first plurality of positioning methods, the means for measuring one or more the one or more PRS resources comprise means for measuring the one or more of the one or more first PRS resources that arrive at the wireless signaling device during the first measurement window, and the wireless signaling device comprises means for measuring, in accordance with the one or more second common batch configuration parameters, one or more second PRS resources that arrive at the wireless signaling device during the second measurement window. The wireless signaling device includes means for prioritizing reporting of a set of aligned PRS measurements, for different positioning methods, of the plurality of PRS measurements over a non-aligned PRS measurement of the plurality of PRS measurements. The wireless signaling device includes means for prioritizing reporting of the plurality of PRS measurements based on an order of the plurality of positioning methods indicated in the batch reporting request.

A batch measurement reporting method includes: receiving, at a wireless signaling device from a network entity, a batch request indicating a plurality of positioning methods; receiving, at the wireless signaling device, one or more PRS resources; measuring, at the wireless signaling device, one or more of the one or more PRS resources for each of the plurality of positioning methods in accordance with the batch request to determine, in combination, a plurality of PRS measurements; and transmitting, from the wireless signaling device to the network entity, a batch measurement report based on the plurality of PRS measurements and including a respective batch measurement sub-report for each of the plurality of positioning methods, each respective batch measurement sub-report comprising a respective batch of the plurality of PRS measurements.

Implementations of such a method may include one or more of the following features. Measuring one or more of the one or more PRS resources comprises measuring one or more of the one or more PRS resources in accordance with one or more respective positioning-method-specific configuration parameters for each of the plurality of positioning methods for which the one or more respective positioning-method-specific configuration parameters are included in the batch request. The batch request comprises one or more common batch configuration parameters, and measuring one or more of the one or more PRS resources comprises measuring the one or more of the one or more PRS resources in accordance with at least the one or more common batch configuration parameters, and the one or more common batch configuration parameters comprise a measurement window, or a first indication of the one or more PRS resources, or a second indication of one or more PRS instances of the one or more PRS resources, or a measurement periodicity, or any combination thereof. The batch request comprises one or more first common batch configuration parameters, and measuring one or more of the one or more PRS resources comprises measuring the one or more of the one or more PRS resources in accordance with at least the one or more first common batch configuration parameters, and the plurality of positioning methods is a first plurality of positioning methods, the one or more PRS resources comprise one or more first PRS resources, the one or more first common batch configuration parameters include a first measurement window corresponding to the first plurality of positioning methods, the batch request comprises one or more second common batch configuration parameters corresponding to a second plurality of positioning methods and including a second measurement window, the second plurality of positioning methods being different from the first plurality of positioning methods, measuring one or more of the one or more PRS resources comprises measuring the one or more of the one or more first PRS resources that arrive at the wireless signaling device during the first measurement window, and the method includes measuring, in accordance with the one or more second common batch configuration parameters, one or more second PRS resources that arrive at the wireless signaling device during the second measurement window. The method includes prioritizing reporting a set of aligned PRS measurements, for different positioning methods, of the plurality of PRS measurements over a non-aligned PRS measurement of the plurality of PRS measurements. The method includes prioritizing reporting of the plurality of PRS measurements based on an order of the plurality of positioning methods indicated in the batch reporting request.

An example non-transitory, processor-readable storage medium includes processor-readable instructions to cause a processor of a wireless signaling device to: receive, from a network entity, a batch request indicating a plurality of positioning methods: receive one or more PRS resources; measure one or more of the one or more PRS resources for each of the plurality of positioning methods in accordance with the batch request to determine, in combination, a plurality of PRS measurements; and transmit, to the network entity, a batch measurement report based on the plurality of PRS measurements and including a respective batch measurement sub-report for each of the plurality of positioning methods, each respective batch measurement sub-report comprising a respective batch of the plurality of PRS measurements.

Implementations of such a storage medium may include one or more of the following features. The processor-readable instructions to cause the processor to measure one or more of the one or more PRS resources comprise processor-readable instructions to cause the processor to measure one or more of the one or more PRS resources in accordance with one or more respective positioning-method-specific configuration parameters for each of the plurality of positioning methods for which the one or more respective positioning-method-specific configuration parameters are included in the batch request. The batch request comprises one or more common batch configuration parameters, and the processor-readable instructions to cause the processor to measure one or more of the one or more PRS resources comprise processor-readable instructions to cause the processor to measure the one or more of the one or more PRS resources in accordance with at least the one or more common batch configuration parameters, and the one or more common batch configuration parameters comprise a measurement window, or a first indication of the one or more PRS resources, or a second indication of one or more PRS instances of the one or more PRS resources, or a measurement periodicity, or any combination thereof. The batch request comprises one or more first common batch configuration parameters, and the processor-readable instructions to cause the processor to measure one or more of the one or more PRS resources comprise processor-readable instructions to cause the processor to measure the one or more of the one or more PRS resources in accordance with at least the one or more first common batch configuration parameters, and the plurality of positioning methods is a first plurality of positioning methods, the one or more PRS resources comprise one or more first PRS resources, the one or more first common batch configuration parameters include a first measurement window corresponding to the first plurality of positioning methods, the batch request comprises one or more second common batch configuration parameters corresponding to a second plurality of positioning methods and including a second measurement window, the second plurality of positioning methods being different from the first plurality of positioning methods, the processor-readable instructions to cause the processor to measure one or more of the one or more PRS resources comprise processor-readable instructions to cause the processor to measure the one or more of the one or more first PRS resources that arrive at the wireless signaling device during the first measurement window, and the storage medium includes processor-readable instructions to cause the processor to measure, in accordance with the one or more second common batch configuration parameters, one or more second PRS resources that arrive at the wireless signaling device during the second measurement window. The storage medium includes processor-readable instructions to cause the processor to prioritize reporting a set of aligned PRS measurements, for different positioning methods, of the plurality of PRS measurements over a non-aligned PRS measurement of the plurality of PRS measurements. The storage medium includes processor-readable instructions to cause the processor to prioritize reporting of the plurality of PRS measurements based on an order of the plurality of positioning methods indicated in the batch reporting request.

An example apparatus includes: a transceiver; a memory; and a processor, communicatively coupled to the transceiver and the memory, configured to: transmit, via the transceiver to a wireless signaling device, a batch request indicating a plurality of positioning methods in accordance with which the wireless signaling device is to measure PRS resources for batch reporting for each of the plurality of positioning methods; and receive a batch report comprising a respective batch of PRS measurements for each of the plurality of positioning methods.

Implementations of such an apparatus may include one or more of the following features. The is configured to transmit the batch request to include one or more respective positioning-method-specific configuration parameters for one or more of the plurality of positioning methods. The batch request further indicates one or more common batch configuration parameters that comprise a measurement window, or a first indication of the PRS resources, or a second indication of one or more PRS instances of the PRS resources, or a measurement periodicity, or any combination thereof. The plurality of positioning methods is a first plurality of positioning methods, the batch request further indicates one or more first common batch configuration parameters including a first measurement window corresponding to the first plurality of positioning methods, and the processor is configured to transmit the batch request including one or more second common batch configuration parameters corresponding to a second plurality of positioning methods and including a second measurement window, the second plurality of positioning methods being different from the first plurality of positioning methods. The processor is configured to transmit, via the transceiver to the wireless signaling device, an indication to prioritize reporting a set of aligned PRS measurements of the PRS measurements over a non-aligned PRS measurement of the PRS measurements. The processor is configured to transmit, via the transceiver to the wireless signaling device, an indication to prioritize reporting of the PRS measurements based on an order of the plurality of positioning methods indicated in the batch request.

Another example apparatus includes: means for transmitting, to a wireless signaling device, a batch request indicating a plurality of positioning methods in accordance with which the wireless signaling device is to measure PRS resources for batch reporting for each of the plurality of positioning methods; and means for receiving a batch report comprising a respective batch of PRS measurements for each of the plurality of positioning methods.

Implementations of such an apparatus may include one or more of the following features. The means for transmitting the batch request comprise means for transmitting the batch request to include one or more respective positioning-method-specific configuration parameters for one or more of the plurality of positioning methods. The batch request further indicates one or more common batch configuration parameters that comprise a measurement window, or a first indication of the PRS resources, or a second indication of one or more PRS instances of the PRS resources, or a measurement periodicity, or any combination thereof. The plurality of positioning methods is a first plurality of positioning methods, the batch request further indicates one or more first common batch configuration parameters including a first measurement window corresponding to the first plurality of positioning methods, and the means for transmitting the batch request comprise means for transmitting the batch request including one or more second common batch configuration parameters corresponding to a second plurality of positioning methods and including a second measurement window, the second plurality of positioning methods being different from the first plurality of positioning methods. The apparatus includes means for transmitting, to the wireless signaling device, an indication to prioritize reporting a set of aligned PRS measurements of the PRS measurements over a non-aligned PRS measurement of the PRS measurements. The apparatus includes means for transmitting, to the wireless signaling device, an indication to prioritize reporting of the PRS measurements based on an order of the plurality of positioning methods indicated in the batch request.

An example method of obtaining a batch report includes: transmitting, from the apparatus to a wireless signaling device, a batch request indicating a plurality of positioning methods in accordance with which the wireless signaling device is to measure PRS resources for batch reporting for each of the plurality of positioning methods; and receiving, at the apparatus, the batch report comprising a respective batch of PRS measurements for each of the plurality of positioning methods.

Implementations of such a method may include one or more of the following features. Transmitting the batch request comprises transmitting the batch request to include one or more respective positioning-method-specific configuration parameters for one or more of the plurality of positioning methods. The batch request further indicates one or more common batch configuration parameters that comprise a measurement window, or a first indication of the PRS resources, or a second indication of one or more PRS instances of the PRS resources, or a measurement periodicity, or any combination thereof. The plurality of positioning methods is a first plurality of positioning methods, the batch request further indicates one or more first common batch configuration parameters including a first measurement window corresponding to the first plurality of positioning methods, and transmitting the batch request comprises transmitting the batch request including one or more second common batch configuration parameters corresponding to a second plurality of positioning methods and including a second measurement window, the second plurality of positioning methods being different from the first plurality of positioning methods. The method includes transmitting, from the apparatus to the wireless signaling device, an indication to prioritize reporting a set of aligned PRS measurements of the PRS measurements over a non-aligned PRS measurement of the PRS measurements. The method includes transmitting, from the apparatus to the wireless signaling device, an indication to prioritize reporting of the PRS measurements based on an order of the plurality of positioning methods indicated in the batch request.

An example non-transitory, processor-readable storage medium comprising processor-readable instructions to cause a processor of an apparatus to: transmit, to a wireless signaling device, a batch request indicating a plurality of positioning methods in accordance with which the wireless signaling device is to measure PRS resources for batch reporting for each of the plurality of positioning methods; and receive a batch report comprising a respective batch of PRS measurements for each of the plurality of positioning methods.

Implementations of such a storage medium may include one or more of the following features. The processor-readable instructions to cause the processor to transmit the batch request comprise processor-readable instructions to cause the processor to transmit the batch request to include one or more respective positioning-method-specific configuration parameters for one or more of the plurality of positioning methods. The batch request further indicates one or more common batch configuration parameters that comprise a measurement window, or a first indication of the PRS resources, or a second indication of one or more PRS instances of the PRS resources, or a measurement periodicity, or any combination thereof. The plurality of positioning methods is a first plurality of positioning methods, the batch request further indicates one or more first common batch configuration parameters including a first measurement window corresponding to the first plurality of positioning methods, and the processor-readable instructions to cause the processor to transmit the batch request comprise processor-readable instructions to cause the processor to transmit the batch request including one or more second common batch configuration parameters corresponding to a second plurality of positioning methods and including a second measurement window, the second plurality of positioning methods being different from the first plurality of positioning methods. The storage medium includes processor-readable instructions to cause the processor to transmit, to the wireless signaling device, an indication to prioritize reporting a set of aligned PRS measurements of the PRS measurements over a non-aligned PRS measurement of the PRS measurements. The storage medium includes processor-readable instructions to cause the processor to transmit, to the wireless signaling device, an indication to prioritize reporting of the PRS measurements based on an order of the plurality of positioning methods indicated in the batch request.

BRIEF DESCRIPTION OF THE DRAWINGS

FIG. 9 is pseudocode of a common location information request information element of FIG. 8.

DETAILED DESCRIPTION

Figure 1:
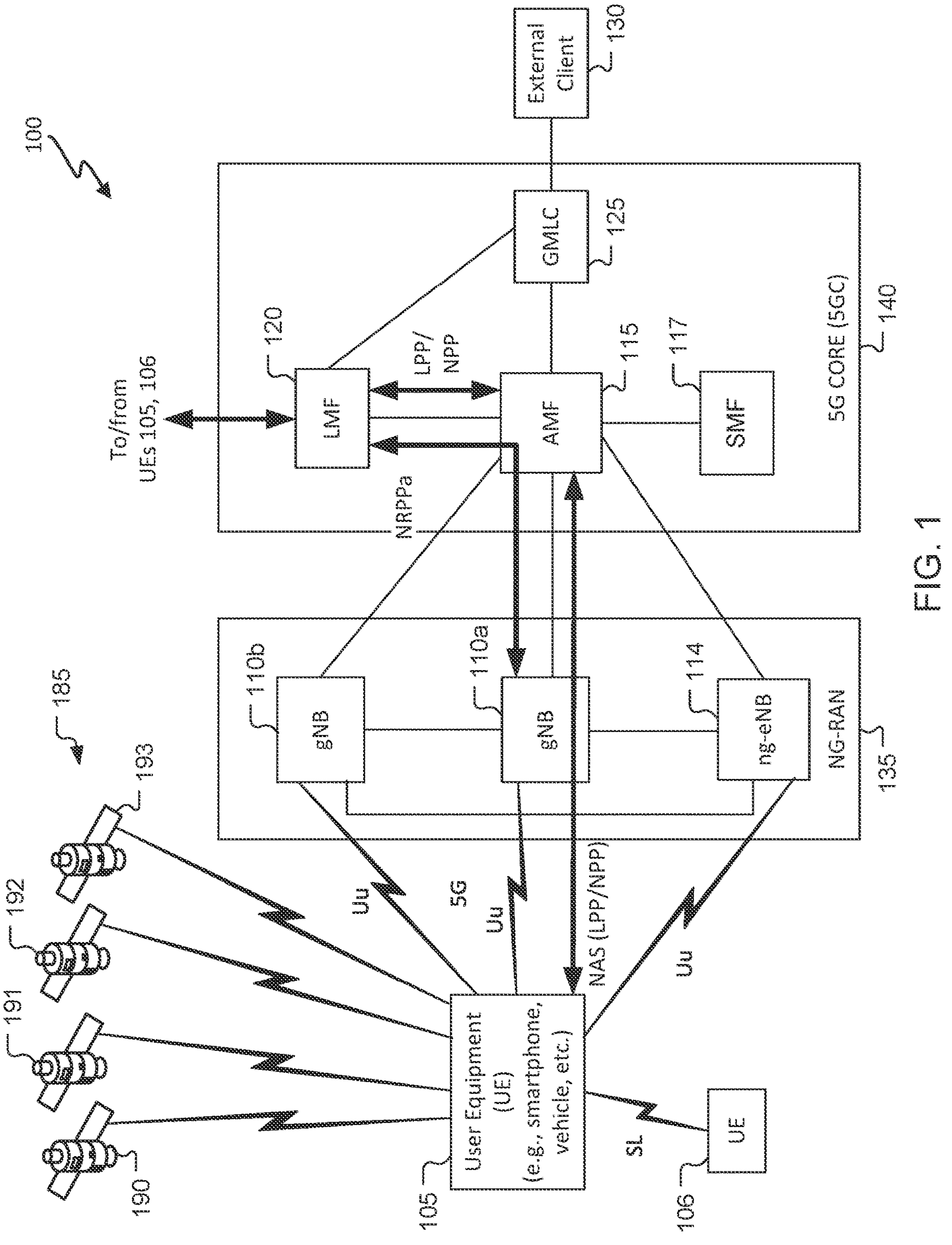
FIG. 1 is a simplified diagram of an example wireless communications system.

Techniques are discussed herein for providing for batch reporting. For example, one or more common batch reporting parameters may be included in a common location information element for requesting location information from a signaling device. The common batch reporting parameter(s) may apply for multiple positioning methods and one or more further criteria may be provided for measuring positioning reference signal (PRS) resources for one or more of the positioning methods. The common batch reporting parameter(s) may, for example, specify a measurement window for receiving PRS resources in order to report measurements of the PRS resources and/or for transmitting PRS resources, may specify multiple measurement windows each corresponding to a different set of positioning methods, may specify PRS resource(s) to be measured, may specify PRS instances to be measured, and/or may specify a measurement periodicity. The multiple positioning methods may correspond to measurements of PRS over multiple communication links (e.g., Uu and sidelink). Batch reporting may be supported for individual positioning methods and/or common batch reporting may be supported for multiple positioning methods. These are examples, and other examples may be implemented.

Items and/or techniques described herein may provide one or more of the following capabilities, as well as other capabilities not mentioned. Positioning accuracy and/or latency may be improved, e.g., by obtaining aligned PRS measurements (e.g., aligned in time, or from the same PRS resource sets, etc.) for multiple positioning methods, e.g., by enabling better hybridization of different positioning methods, and/or by tracking how measurements change across time across different methods. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network: NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 50 new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*. 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*. 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*. 110*b* and/or the ng-eNB 114, such as parameters defining directional SS (Synchronization Signals) or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP. RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*. 110*b*, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
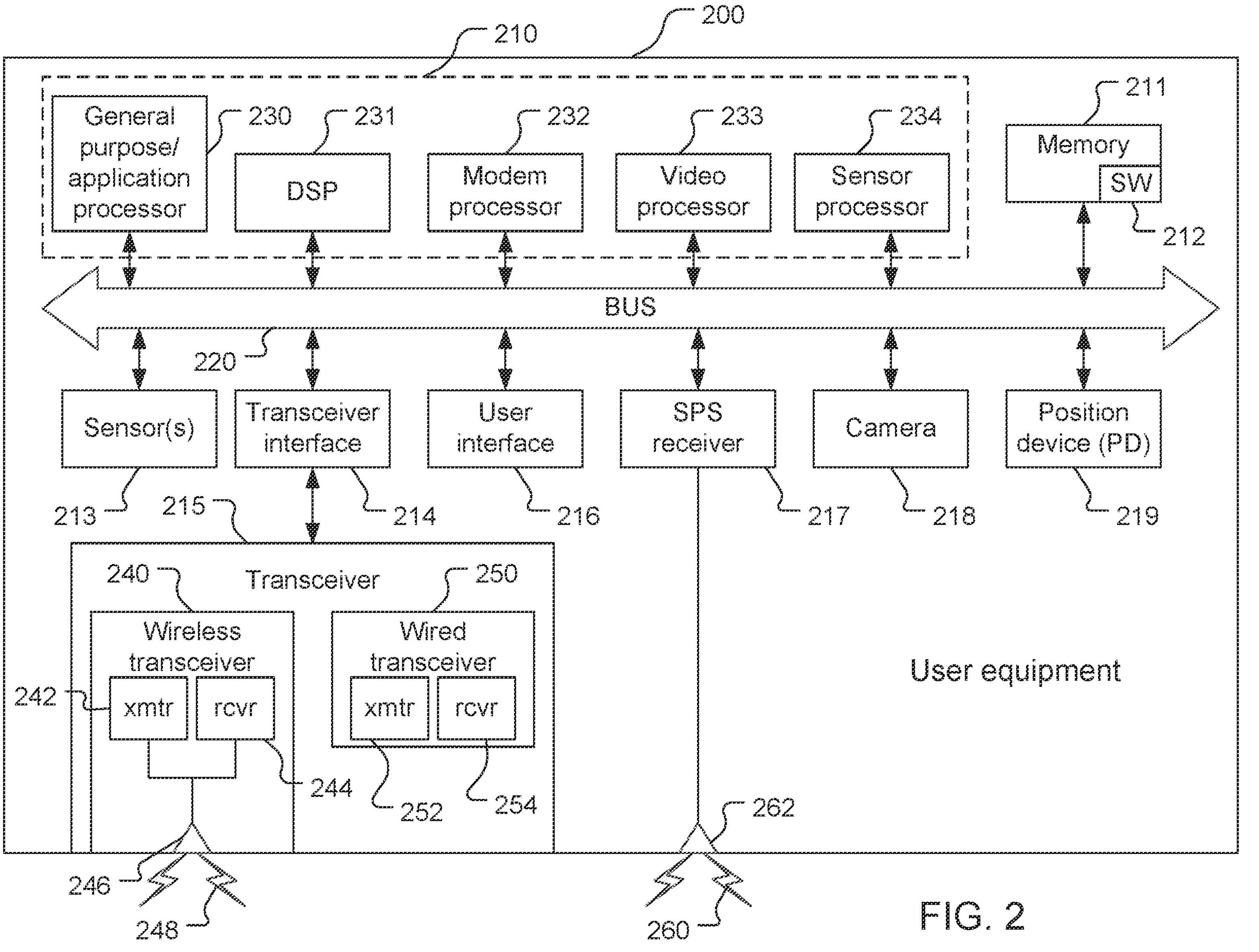
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined. e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured. e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals. e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
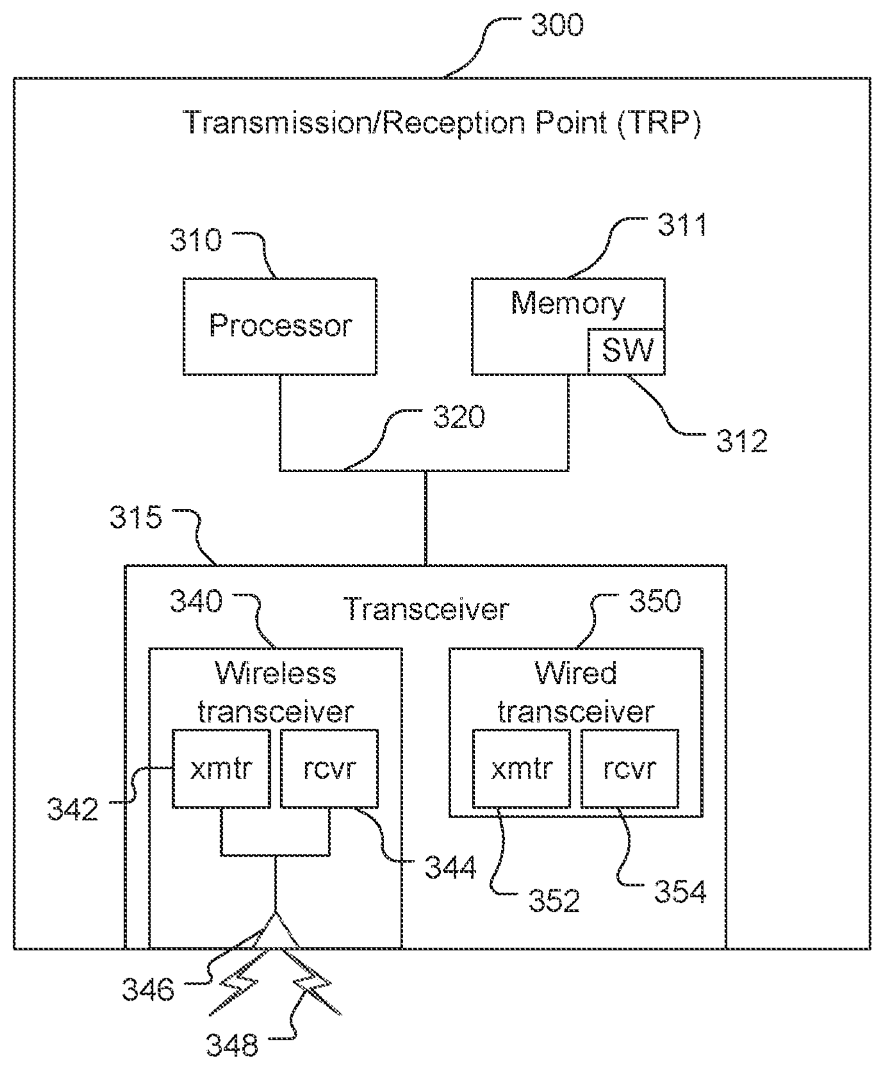
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System). CDMA (Code Division Multiple Access). WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
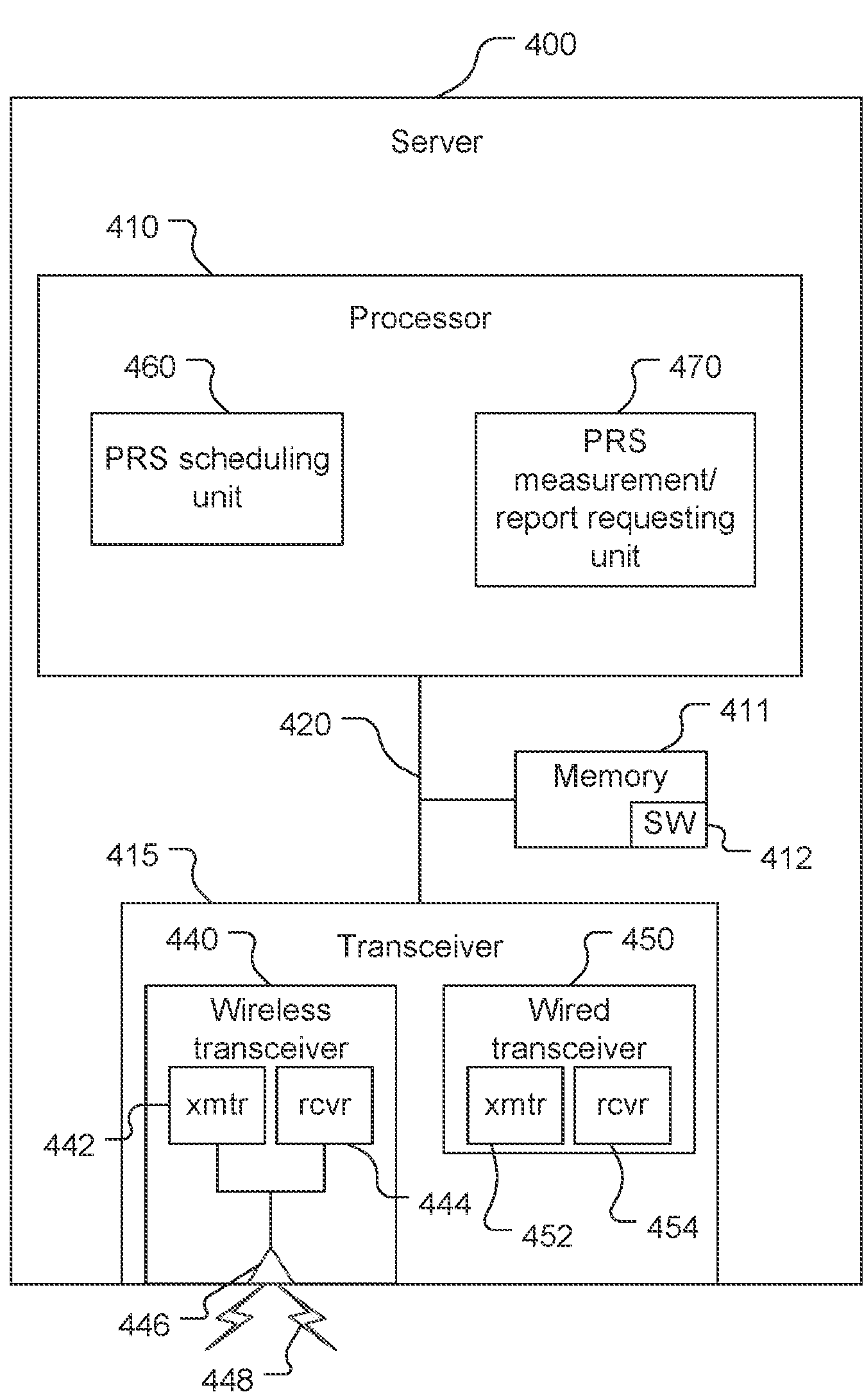
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA. Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx\rightarrow Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx\rightarrow RX}$ between the transmission time of the RTT measurement signal from the base station and the ToA of the RTT response at the base station to the UE-reported time difference $T_{Rx\rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nm resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning Apparatus

Referring also to FIG. 4 again, the description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function. The processor 410 (possibly in conjunction with the memory 411 and, as appropriate, the transceiver 415) may include a PRS scheduling unit 460 and a PRS measurement/report requesting unit 470. The PRS scheduling unit 460 and the PRS measurement/report requesting unit 470 are discussed further below, and the description may refer to the processor 410 generally, or the server 400 generally, as performing any of the functions of the PRS scheduling unit 460 or the PRS measurement/report requesting unit 470.

Figure 5:
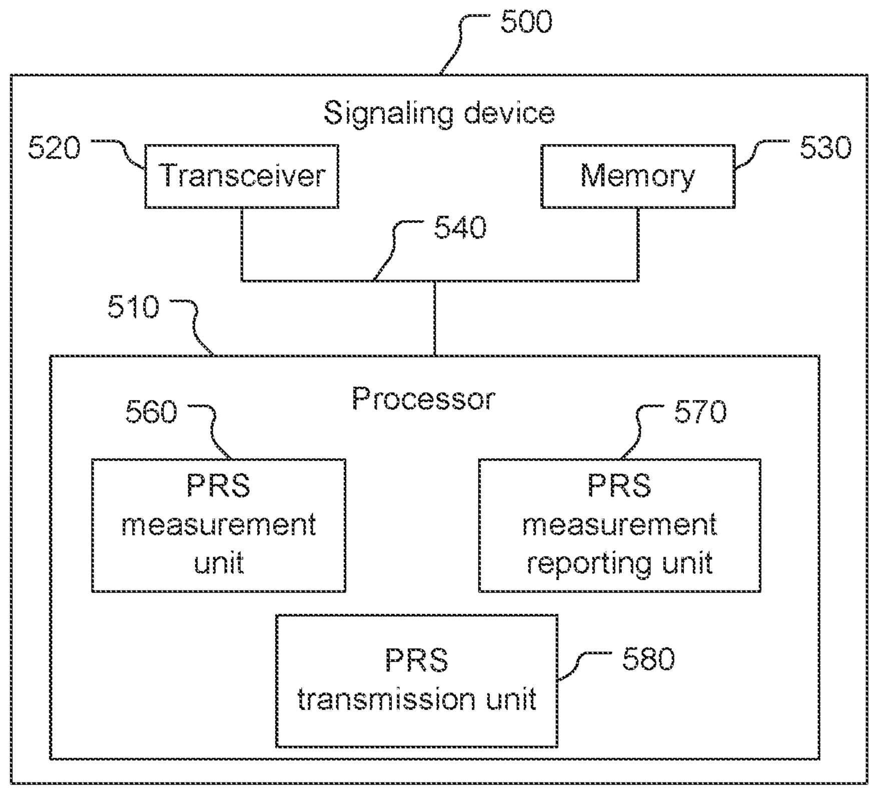
FIG. 5 is a block diagram of an example signaling device.

Referring also to FIG. 5, a wireless signaling device 500 includes a processor 510, a transceiver 520, and a memory 530 communicatively coupled to each other by a bus 540. The device 500 may include the components shown in FIG. 5. The device 500 may include one or more other components such as any of those shown in FIG. 2 such that the UE 200 may be an example of the wireless signaling device 500, or one or more of the components shown in FIG. 3 such that the TRP 300 may be an example of the wireless signaling device 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions. As another example, the processor 510, the transceiver 520, and the memory 530 may include one or more components of the processor 310, the transceiver 315, and the memory 311, respectively. Still other examples of the wireless signaling device may be implemented. For example, the wireless signaling device 500 may be a reference location device that is a standalone device, or part of a base station (e.g., a gNB). The device 500 may, for example, include an enhanced transmission point (eTP) and/or an enhanced reception point (eRP) with the device 500 being part of a base station. The wireless signaling device 500 is capable of receiving and/or transmitting wireless signals (e.g., DL-PRS, UL-PRS, SL-PRS), and may also be configured to transfer (transmit and/or receive) wired signals.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the transceiver 520) may include a PRS measurement unit 560, a PRS measurement reporting unit 570, and/or a PRS transmission unit 580. Depending on the implementation of the signaling device 500, one or more of the units 560, 570, 580 may be omitted from the signaling device 500. The PRS measurement unit 560, the PRS measurement reporting unit 570, and the PRS transmission unit 580 are discussed further below, and the description may refer to the processor 510 generally, or the wireless signaling device 500 generally, as performing any of the functions of the PRS measurement unit 560, or the PRS measurement reporting unit 570, or the PRS transmission unit 580.

The PRS measurement unit 560 and the PRS transmission unit 580 are configured to measure and transmit appropriate PRS. For example, the PRS measurement unit 560 may be configured to measure DL-PRS, UL-PRS, and/or SL-PRS and the PRS transmission unit 580 may be configured to transmit UL-PRS, DL-PRS, and/or SL-PRS. For example, if the device 500 is a UE, then the PRS measurement unit 560 will likely be configured to measure DL-PRS and SL-PRS, and may be configured to measure UL-PRS, and the PRS transmission unit 580 will likely be configured to transmit UL-PRS and SL-PRS, and may be configured to transmit DL-PRS. As another example, if the device 500 is a TRP or part of a base station, then the PRS measurement unit 560 will likely be configured to measure UL-PRS, and may be configured to measure DL-PRS and/or SL-PRS, and the PRS transmission unit 580 will likely be configured to transmit DL-PRS, and may be configured to transmit UL-PRS and/or SL-PRS. As another example, if the device 500 is a stand-alone reference location device, then the PRS measurement unit 56) and the PRS transmission unit 570 may be configured similar to the configurations for the device 500 being a UE.

Transfer and measurement of PRS may help with position determination of a mobile device, such as a UE, and/or with measurement calibration. For example, various PRS measurements may be used to support UE-assisted and/or UE-based position calculation using one or more of a variety of positioning techniques. For example, DL-PRS may be measured by the PRS measurement unit 560 to determine RSTD for DL-TDOA or to determined RSRP for DL-TDOA. DL-AoD, and/or multi-RTT techniques. As another example, DL-PRS and UL-PRS may be measured by the PRS measurement unit 560 to determine a UE Rx-Tx time difference for multi-RTT. As another example, SSB or CSI-RS (Channel State Information Reference Signal) for RRM (Radio Resource Management) may be measured by the PRS measurement unit 560 to determine SS-RSRP (Synchronization Signal RSRP for RRM), SS-RSRQ (for RRM), CSI-RSRP (for RRM), CSI-RSRQ (for RRM) for E-CID.

Measurement reporting may be triggered reporting (event-based reporting) or periodic reporting (timing-based reporting), e.g., as specified in the 3GPP (3$^{rd}$ Generation Partnership Project) 38.355 Technical Specification. For triggered reporting, occurrence of an event causes reporting of one or more measurements. For example, if a cell-change field is set to TRUE, then a target device (i.e., the device whose location is to be determined, such as a UE) provides requested location information each time the primary cell has changed. A maximum duration for triggered reporting may be set by a reportingDuration field in a request location information IE (information element). Periodic reporting may be configured by a number of reports to be provided (by a reportingAmount field of the IE, with values such as 1, 2, 4, 8, 16, 32, 64) and a reporting interval, e.g., of a time in seconds between each report (such as 1, 2, 4, 8, 10, 16, 20, 32, or 64).

Batch Reporting

Measurement of PRS resources and reporting of PRS measurements may be performed in batches. Batch measurement and/or reporting may reduce signaling overhead. Batch measurement of PRS resources for different positioning methods may help ensure that PRS measurements for different positioning methods are taken under similar conditions so that the different positioning methods may be used in combination to determine a location of a target UE, or to calibrate measurements, or to validate a location determined by one method with a location determined by another method, and/or for other purposes. Measurements can be made for multiple PRS, over multiple PRS instances, and for multiple positioning methods and reported in a batch report (which may include multiple batch sub-reports).

Figure 6:
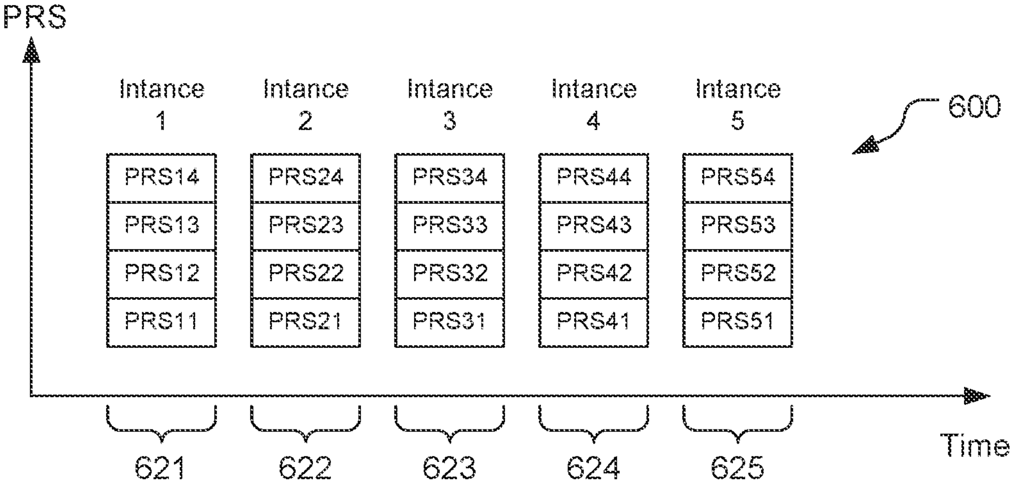
FIG. 6 is a timing diagram of positioning reference signal instances.

Referring also to FIG. 6, PRS resource sets may be repeated at a rate specified by an instance periodicity, such that multiple instances of PRS resource sets of multiple PRS resources are conveyed. A PRS instance periodicity may, for example, be 4, 5, 8, 10, 16, 10, 16, 20, 32, 40, 64, 80, 160, 320, 640, 1280, 2560, 5120, or 10240 milliseconds. If, for example, a reporting period is 1 second, and an instance periodicity is 4 ms, then 250 instances will occur each reporting period. In FIG. 6, PRS resources 600 of five PRS instances 621, 622, 623, 624, 625 are shown (although numerous other PRS instances may be conveyed) each comprising a PRS resource set of multiple PRS resources, here four PRS resources per resource set, although this is a non-limiting example and other quantities of PRS resources may be contained in a PRS resource set (and which PRS resources are included in each PRS resource set, and/or a quantity of PRS resources, may vary between different instances). PRS instance N includes M PRS resources, e.g., so the PRS instance 621 (instance 1) includes PRS resources labeled PRS11, PRS12, PRS13, PRS14, the PRS instance 622 (instance 2) includes PRS resources labeled PRS21, PRS22, PRS23, PRS24, etc. The PRS resources may differ from each other in time and/or frequency.

Limitations may exist for PRS resource measurements. For example, the device 500 may have a limited number of Rx-Tx measurements per PRS source, or a limited number of measurements providable in a single batch report, or a threshold measurement periodicity, etc. Measurement capabilities may be different (i.e., different limits may be provided) for different frequency bands.

The PRS measurement reporting unit 570 may be configured to provide a batch measurement report, in accordance with one or more positioning methods to be implemented and/or in accordance with one or more batch configuration parameters received from the PRS measurement/report requesting unit 470 of the server 400 and corresponding to multiple measurements of one or more PRS resources from one or more PRS instances, e.g., the PRS instances 621-625. Batch reporting may, for example, help ensure that RTT positioning can be performed by reporting multiple UL-PRS resource measurements such that a UL-PRS can be aligned with corresponding DL-PRS to enable RTT calculations. The PRS measurement reporting unit 570 may report one or more measurement instances (e.g., of RSTD, DL RSRP, and/or UE Rx-Tx) in a single batch measurement report to the server 400, e.g., for UE-assisted positioning, with each measurement instance comprising one or more measurements (of the same or different type) of one or more PRS resources of one or more corresponding PRS instances.

Figure 7:
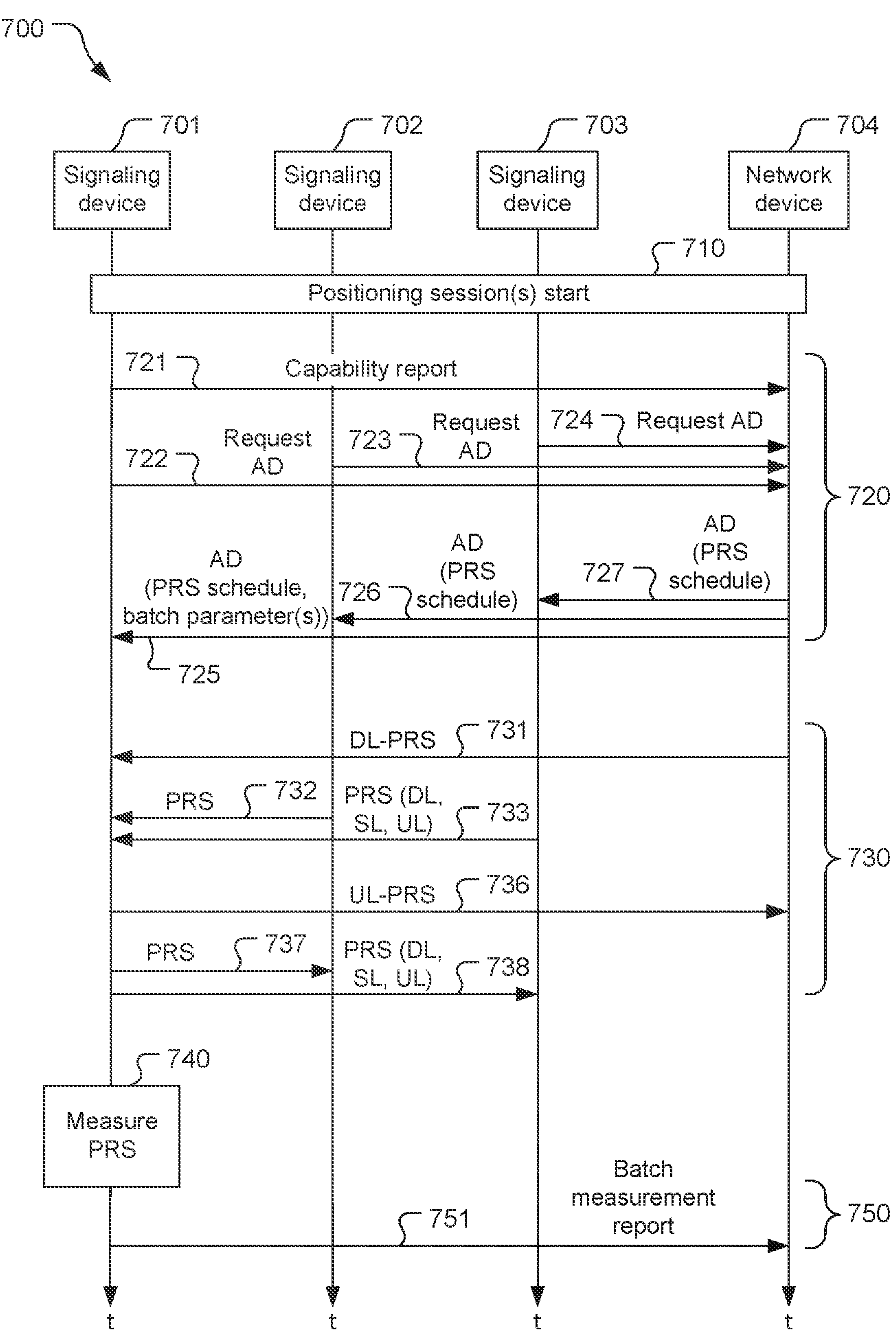
FIG. 7 is a signaling and process flow for providing batch reporting criteria, measuring positioning reference signal resources, and batch reporting position information.

Referring to FIG. 7, with further reference to FIGS. 1-6, a signaling and process flow 700 for providing batch reporting parameters, measuring PRS resources, and batch reporting position information includes the stages shown. The flow 700 is an example, as stages may be added, rearranged, and/or removed. As shown in FIG. 7, signals may be transferred between signaling devices 701, 702, 703, and a network device 704. The signaling devices 701-703 may be examples of the signaling device 500, and thus any of the signaling devices 701-703 may be a UE, a TRP, or another device (e.g., a reference location device). The network device 704 may comprise one or more devices such as the TRP 300 and the server 400 (e.g., an LMF) separately, or the TRP 300 and the server 400 (e.g., LMF) integrated into a single device, such as an LMF in RAN. The discussion of the network device 704 refers to components of the server 400, but the discussion is applicable to components of another device such as an integrated TRP and server.

At stage 710, positioning sessions are started between the network device 704 the signaling devices 701-703. The positioning sessions are started so that the signaling devices 701-703 can obtain assistance data for PRS transfer (e.g., between each other and/or with the network device 704). The positioning sessions may be used to help determine a position of a device (e.g., the signaling device 701 and/or another device) and/or to help calibrate signaling information (e.g., timing). To start the positioning sessions, the signaling devices 701-703 perform handshakes with the network device 704 by exchanging appropriate messages to establish respective positioning sessions for transferring PRS signaling. The handshaking may include determining one or more positioning techniques to be used and/or appropriate position information (measurement(s) and/or location estimate(s)) to be determined.

At stage 720, the signaling device 701 transmits a capability report to the network device 704 and the signaling devices 701-703 request and receive respective assistance data (AD). The processor 510 of the signaling device 701 may be configured to produce and transmit a capability report 721 to the network device 704. The capability report 721 may indicate that the signaling device 701 is configured to provide batch reports of Uu and SL positioning, e.g., batch reports with Uu signal measurements (e.g., DL-PRS signal measurements and/or UL-PRS signal measurements, e.g., ToA, ToD, Rx-Tx, RSRP, etc.) and SL signal measurements (e.g., ToA, ToD, Rx-Tx, etc.) occurring in parallel. The Uu signal measurements are measurements related to signals transferred over the Uu interface (i.e., air interface between a UE and a network entity such as the network device 704 (e.g., the TRP 300)). The capability report 721 may thus indicate that the signaling device 701 may report Uu and SL signal measurements that are aligned (e.g., correspond to PRS that are received and/or transmitted concurrently such that conditions are similar for the various measurements (e.g., relative relationship(s) of the signaling device 701 to the device(s) transmitting/receiving the PRS is(are) the same when the PRS are transmitted/received by the signaling device 701)).

The capability report 721 may also or alternatively indicate a prioritization behavior of the signaling device 701. The prioritization behavior may indicate what priority the signaling device 701 will give for making/reporting measurements, e.g., how the signaling device 701 will determine which measurements to make and/or report if the signaling device 701 will not (e.g., cannot) make and/or report all measurements requested. For example, if the signaling device 701 has a measurement limit that is exceeded, the signaling device 701 will make and report measurements that are aligned (e.g., in PRS instance, etc.) with higher priority than measurements that are not aligned with other respective measurements. As another example, the signaling device 701 may prioritize one type of measurement over another, e.g., based on a positioning method being implemented for which measurements are sought. The capability report 721 may, however, not include a prioritization behavior. For example, the signaling device 701 may be statically configured (e.g., designed and manufactured) with the prioritization behavior and the network device 704 statically configured with knowledge of the prioritization behavior (e.g., with prioritization rules stored in memory).

The signaling device 701 may be configured to prioritize measurement and/or reporting based on one or more indications from the network device 704. For example, the signaling device 701 may prioritize PRS measurement and/or PRS measurement reporting in accordance with an order of measurement/reporting indications provided by the network device 704 to the signaling device 701 (e.g., if a measurement/reporting request lists RTT before AoD, then the signaling device 701 may prioritize RTT measurements and/or reporting of such measurements ahead of AoD measurements). The network device 704 (e.g., an LMF) may be configured to determine the priority(ies) of PRS measurements and/or PRS measurement reporting based on one or more expected metrics. e.g., the expected positioning accuracy and/or quality of service of multiple positioning methods. For example, the PRS measurement/report requesting unit 470 may be configured to prioritize making and/or reporting measurements corresponding to a positioning method with a higher expected positioning accuracy over making and/or reporting measurements corresponding to a positioning method with a lower expected positioning accuracy.

Also at stage 720, the signaling devices 701-703 send assistance data (AD) requests 722, 723, 724 to the network device 704 and the network device 704 sends respective AD 725, 726, 727. The AD requests 722-724 request AD to help the signaling devices 701-703 with signal transfer, e.g., to measure PRS, to guide PRS transmission, etc. The network device 704 determines the AD 725-727, e.g., with the server 400 negotiating with the TRP 300 to determine the AD 725-727. The AD 725-727 include one or more respective PRS schedules, e.g., a DL-PRS schedule, a UL-PRS schedule, and/or an SL-PRS schedule, as appropriate. The PRS schedules indicate the timing and frequency of PRS resources to assist the signaling devices 701-703 to measure scheduled PRS resources and/or to transmit PRS resources in accordance with the schedule(s) as appropriate.

Figure 8:
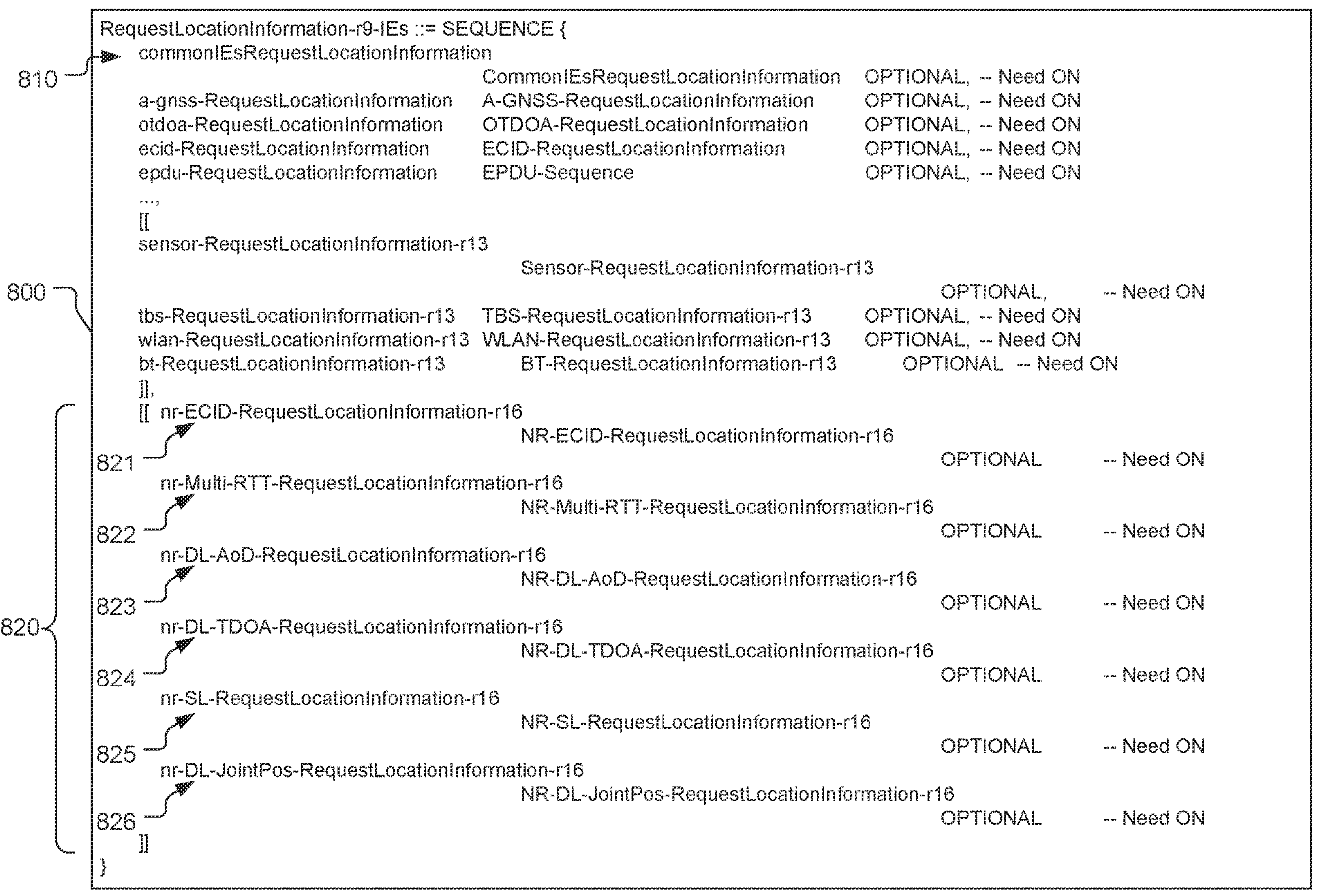
FIG. 8 is pseudocode of a location information request information element.

Referring also to FIG. 8, the AD 725 includes a location information request, for example, a location information request 800 (shown in pseudo code) that includes a common information portion 810 and an individual information portion 820. The common information portion 810 indicates one or more parameters that are used to determine and/or report position information (e.g., measurements, processed measurements, location estimates) for different positioning methods. Common parameters may include, for example, location information type, a triggered reporting parameter, quality of service, etc. The individual information portion includes respective criteria for one or more positioning methods with the criteria being specific to each respective method (e.g., different from one or more other methods). The criteria may include, for example, measurements to be made and a reporting configuration for reporting the measurements. In the location information request 800, the individual information portion 820 includes a request 821 for ECID location information, a request 822 for multi-RTT location information, a request 823 for DL-AoD location information, a request 824 for DL-TDOA location information, a request 825 for SL location information, and a request

826 for DL-joint positioning location information. Each of the requests 821-826 is optional, i.e., may or may not be included in the location information request 800. The request 825 is a request for location information for sidelink positioning, i.e., positioning using SL-PRS transfers. e.g., between multiple UEs. The request 826 is a request for location information for a positioning method that uses a combination of DL-PRS and SL-PRS, e.g., measurement(s) by a UE of DL-PRS from one or more TRPs and measurement(s) of SL-PRS transferred between UEs.

Figure 10:
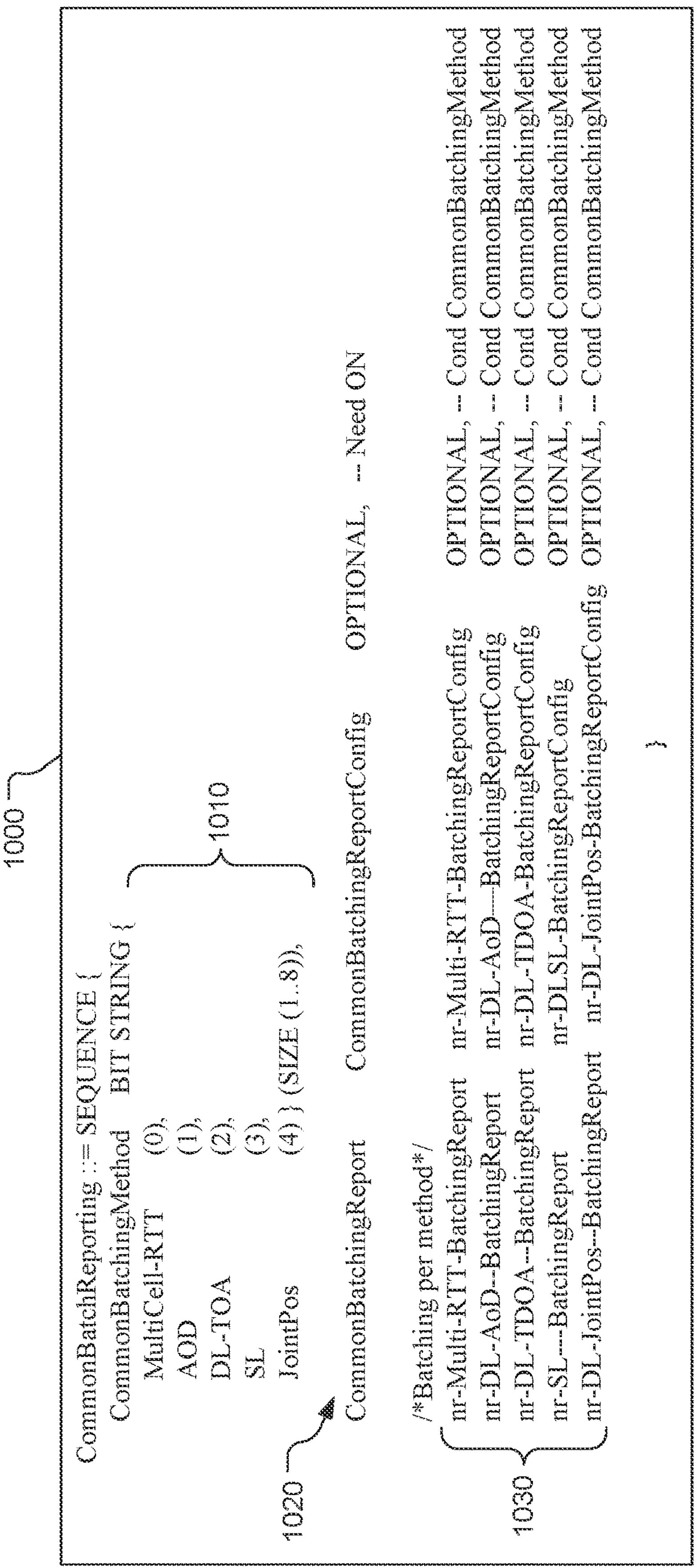
FIG. 10 is pseudocode of a common batch reporting information element of FIG. 9.

Referring also to FIGS. 9 and 10, the AD 725, e.g., the common information portion 810 of the location information request 800, includes one or more parameters indicating one or more batch PRS configurations (e.g., a batch PRS measurement configuration and/or a batch PRS measurement report configuration), which may be called batch criteria. As shown in FIG. 9, the common information portion 810 of the request 800 comprises a common location information request information element (IE) 900 that includes a list of IEs of respective information guiding determination of location information for multiple positioning methods. Among the IEs is a common batch reporting IE 910 that provides common batch reporting criteria. The common batch reporting IE 910, despite including the term "reporting", may include one or more measurement parameters for measuring PRS and/or one or more reporting parameters for batch reporting PRS measurements. As shown in FIG. 10, a common batch reporting IE 1000, which is an example of the common batch reporting IE 910, includes a common batching method IE 1010 that is a coded list indicating positioning methods to which a common batching report IE 1020 applies, and includes individual method configurations 1030 including method-specific configuration information.

The common batching method IE 1010 indicates what positioning methods will use the common batching report IE 1020. Here, the common batching method IE 1010 comprises a bit string with each bit corresponding to a positioning method, and with a value of the bit indicating whether the common batch configuration applies to the corresponding positioning method. For example, a bit value of 0 may indicate for the signaling device 701 not to use the common batching report IE 1020 for measuring PRS and batch reporting PRS measurements for the corresponding positioning method, and thus use a method-specific configuration for PRS for such positioning method (if the positioning method is being used). On the other hand, a bit value of 1 may indicate for the signaling device 701 to use the common batching report IE 1020 for measuring PRS and batch reporting PRS measurements for the corresponding positioning method.

The common batching report IE 1020 indicates the batching configuration(s) for the method(s) indicated by the common batching method IE 1010. For example, the common batching report IE 1020 may indicate to report multiple measurements together as part of a batch report. The common batching report IE 1020 may also or alternatively indicate any combination of the following parameters: one or more measurement windows for receiving/transmitting PRS resources to be measured for batch reporting, measurement periodicity, reporting periodicity, a quantity of PRS instances to measure, a quantity of PRS resources to measure, a quantity of PRS resource sets to measure, a quantity of Positioning Frequency Layers (PFLs) to measure, a quantity of TRPs to measure, a quantity of PRS measurements to batch report, from which PRS instances to measure PRS resources, from which PRS instances to report PRS measurements, which PRS resources to measure, measurements of which PRS resources to batch report, a reporting window, etc. A measurement window (which may be called a scheduled location time, or a scheduled location window, or scheduled location window in advance, or scheduled location time in advance) may be provided in a location request that is applicable to multiple positioning methods when the multiple methods are associated with the same batch reporting request. The measurement window is a time for which the network device 704 (e.g., an LMF) wants PRS measurements. The network device 704 may determine the measurement window based on a location request from a location client (e.g., an application) for location of a target UE. The signaling device 701 is expected to measure reference signals received during the measurement window and/or transmit reference signals during the measurement window for the positioning methods (e.g., in SL/Uu positioning, for DL-PRS reception and SL-PRS and UL-PRS transmission). A reporting window may indicate, for example, a time to start batch reporting and a time to stop batch reporting (e.g., a timespan (e.g., 10 sec) relative to the start time). The common batch reporting IE 1020 provides parameters to help ensure that measurements for different positioning methods (e.g., Uu positioning and SL positioning in parallel) are aligned in time, i.e., measurements are taken for different measurements at the same time or very nearly the same time (e.g., from the same PRS instance(s), with the same measurement periodicity, etc.) such that positioning conditions are the same (or can be assumed to be the same). Positioning conditions include the relative locations (relative separations and directions) between devices transferring signals (e.g., the signaling device 701 relative to the other signaling devices 702, 703), clock drift (of devices measuring and/or sending PRS), and/or channel characteristics. With the measurements aligned, the relative locations of the signaling devices 701-703 (and the channel conditions) will not be significantly different for each of the aligned measurements, such that the different positioning methods should yield the same location estimate for the signaling device 701. The different positioning methods may be used in combination, e.g., to determine a combined location estimate for the signaling device 701 and/or to use measurement(s) and/or location estimate(s) determined for one or more positioning methods to calibrate the measurement(s) and/or location estimate(s) determined for one or more other positioning methods.

Each of the individual method configurations 1030 corresponds to a respective positioning method (here, multi-RTT, DL-AoD, DL-TDOA, SL, and DL-joint positioning). Each of the configurations 1030 is conditional, with each respective configuration being included if the corresponding positioning method is indicated in the common batching method IE 1010. Each of the configurations 1030 provides a method-specific set of configuration parameters, e.g., what measurement(s) to make (e.g., ToA and Rx-Tx for RTT, and RSRP for AoD). The configurations 1030 may all be omitted if the measurements for the requested positioning methods are the same. For any positioning method for which measurements are desired, but that is not indicated in the common batching method IE 1010 to use the common batch configuration parameters, a method-specific configuration may be used that includes parameters such as those discussed above with respect to the common batching report IE 1020 and one or more further parameters such as what measurement(s) to make.

At stage 730, appropriate reference signals are transferred between the signaling device 701 and one or more of the signaling devices 702, 703 and/or the network device 704 based on the positioning method(s) to be implemented. The network device 704 may send DL-PRS 731 to the signaling device 701. The signaling device 702 and/or the signaling device 703 may send PRS 732, 733 (e.g., DL-PRS, SL-PRS, UL-PRS depending on respective configurations of the signaling devices 701-703), respectively, to the signaling device 701. The signaling device 701 may send UL-PRS 736 to the network device 704 (e.g., if the signaling device 701 is a UE). The signaling device 701 may send PRS 737, 738 (e.g., DL-PRS, SL-PRS, UL-PRS depending on respective configurations of the signaling devices 701-703) to one or both of the signaling devices 702, 703, respectively.

At stage 740, the signaling device 701 measures some or all of the PRS 731-733. For example, the PRS measurement unit 560 of the signaling device 701 measures one or more PRS resources of the PRS 731-733 in accordance with the common batch reporting IE 1000 and any method-specific configurations as appropriate.

Figure 11:
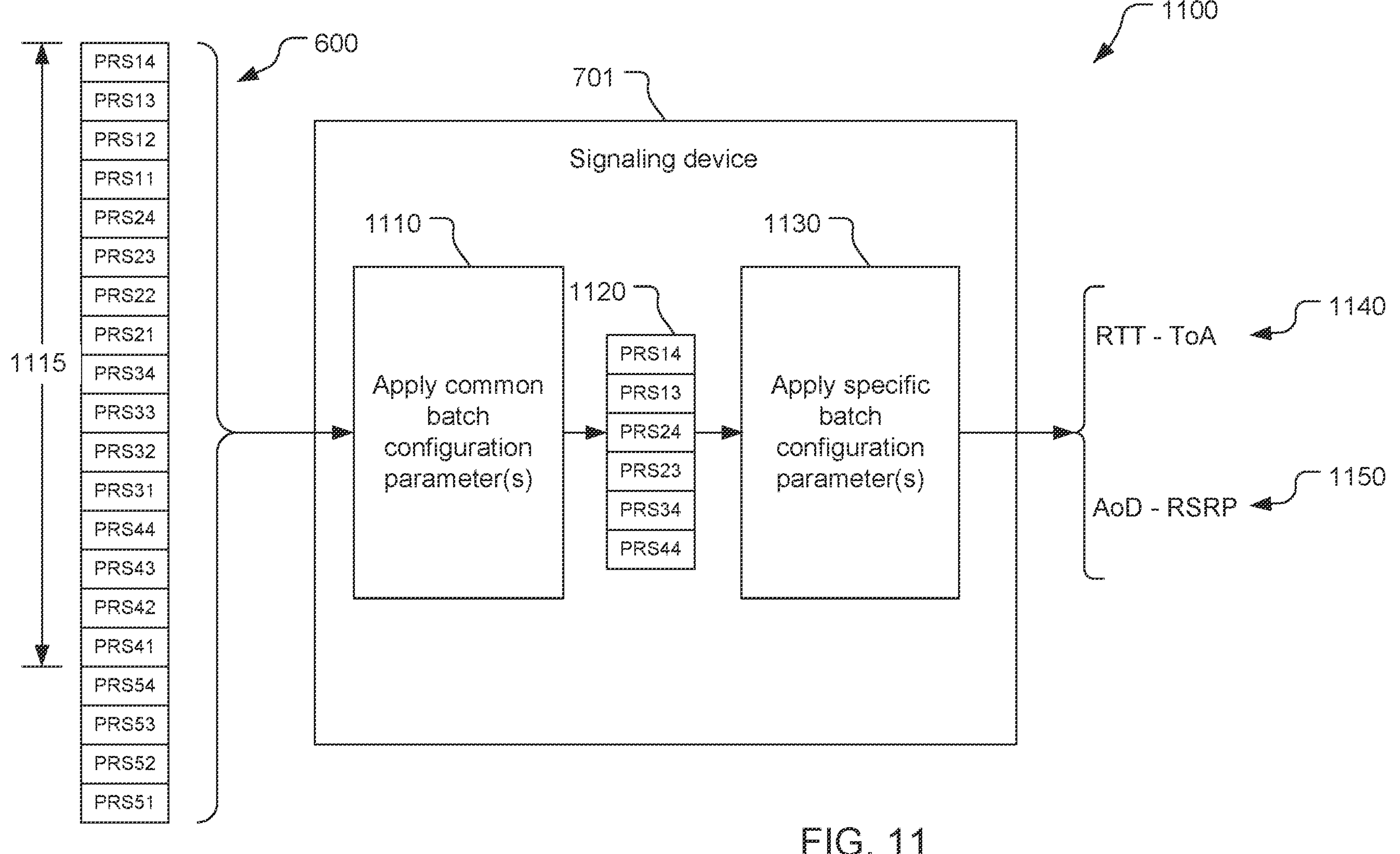
FIG. 11 is an example flow of measuring positioning reference signals in accordance with the common batch reporting information element shown in FIG. 10 with a single measurement window.

Referring also to FIG. 11, an example flow 1100 of measuring PRS in accordance with the common batch reporting IE 1000 (including method-specific configurations) for RTT and AoD is illustrated. Here, the PRS resources 600 of the PRS instances 621-625 shown in FIG. 6 are received by the signaling device 701. At a stage 1110, the signaling device 701 applies the common batch configuration parameter(s) provided in the common batch report IE 1020 to the PRS resources 600, in this example resulting in the signaling device 701 filtering by time and frequency for a PRS resource subset 1120. In the example shown in FIG. 11, a time window 1115 is applied as part of the common batch configuration parameters to measure PRS resources within the PRS instances 621-624. A single measurement window may be configured for multiple positioning methods. At stage 1130, the signaling device 701 applies the method-specific configurations for RTT and AoD positioning methods to the PRS resource subset 1120 resulting, in this example, in ToA measurements 1140 for RTT and RSRP measurements 1150 for AoD. The stages 1110, 1130 are shown separately for illustrative purposes but may be combined.

Figure 12:
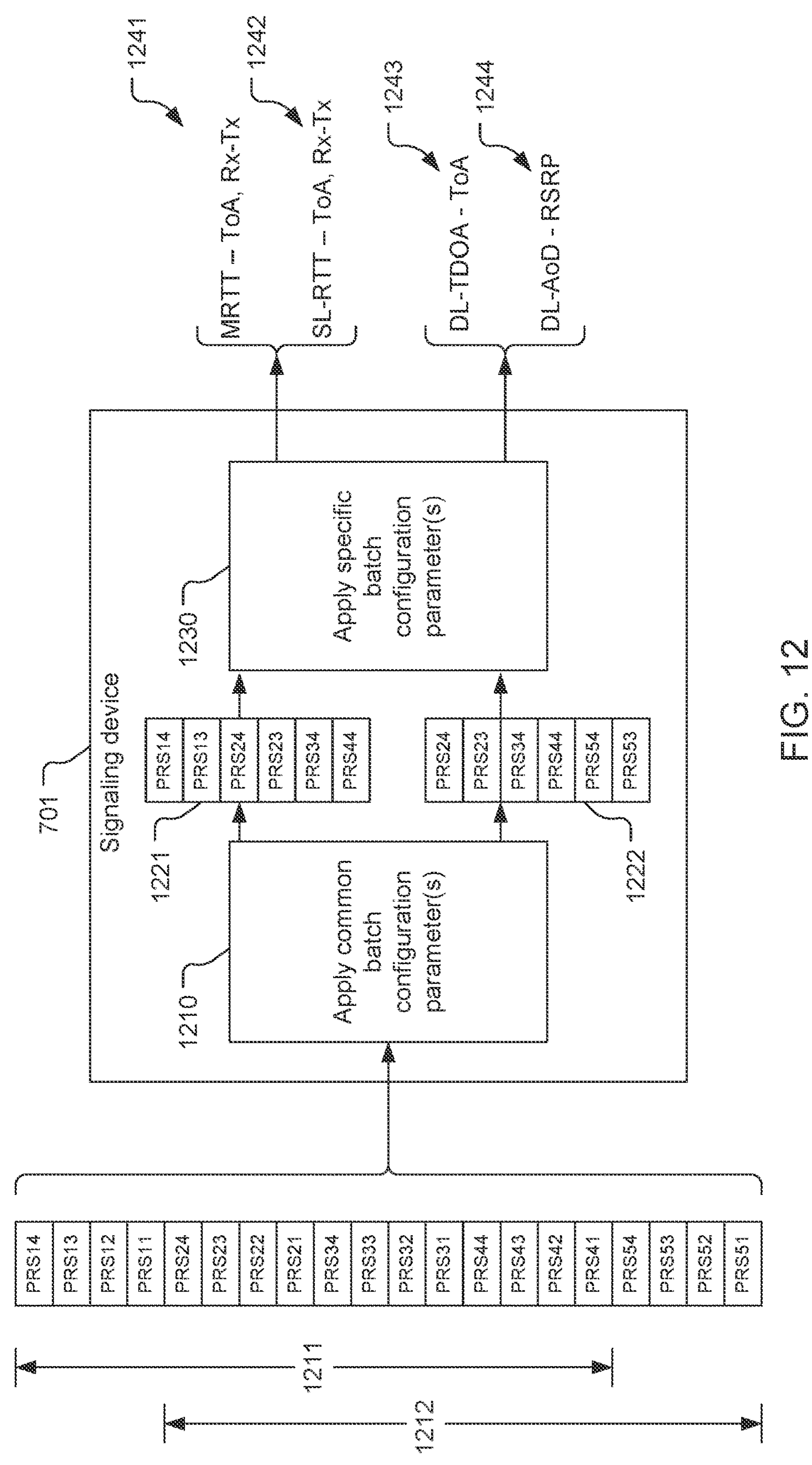
FIG. 12 is an example flow of measuring positioning reference signals in accordance with the common batch reporting information element shown in FIG. 10 with multiple measurement windows.

Referring also to FIG. 12, an example of measuring PRS in accordance with the common batch reporting IE 1000 (including method-specific configurations) for RTT and AoD is illustrated where multiple measurement windows are commonly applied. At stage 1210, the signaling device 701 applies the common batch configuration parameters to the PRS resources 600. In this example, the common batch configuration parameters include two different measurement windows 1211, 1212 each corresponding to a combination of positioning methods (here Multi-RTT and SL-RTT for the measurement window 1211, and DL-TDOA and DL-AoD for the measurement window 1212). The signaling device 701 is expected to measure reference signals received during the measurement windows and/or transmit reference signals during the measurement windows for the positioning methods corresponding to the measurement windows. Applying the common batch configuration parameters, including the two different measurement windows 1211, 1212, results in two PRS resource subsets 1221, 1222. At stage 1230, the signaling device 701 applies the respective method-specific batch configuration parameters to the PRS resource subsets 1221, 1222, yielding ToA/Rx-Tx measurements 1241 for multi-RTT, ToA/Rx-Tx measurements 1242 for SL-RTT, ToA measurements 1243 for DL-TDOA, and RSRP measurements 1244 for DL-AoD. The measurements 1241-1244 for all four positioning methods may be included in a single batch measurement report (e.g., as discussed below). The examples shown in, and discussed with respect to, FIG. 12 are not limiting of the disclosure.

At stage 750, the signaling device 701 transmits a batch measurement report 751 to the network device 704. The batch measurement report 751 batch reports position information (e.g., PRS measurements) in accordance with the batch reporting criteria provided at stage 720 to the signaling device 701, e.g., batch reporting configuration parameters provided in the common batching report IE 1020 and/or the appropriate configuration(s) 1030. The batch measurement report 751 includes a batch of measurements for each positioning method for which batch measurement reporting was requested by the network device 704 in the location information request in the AD 725.

Figure 13:
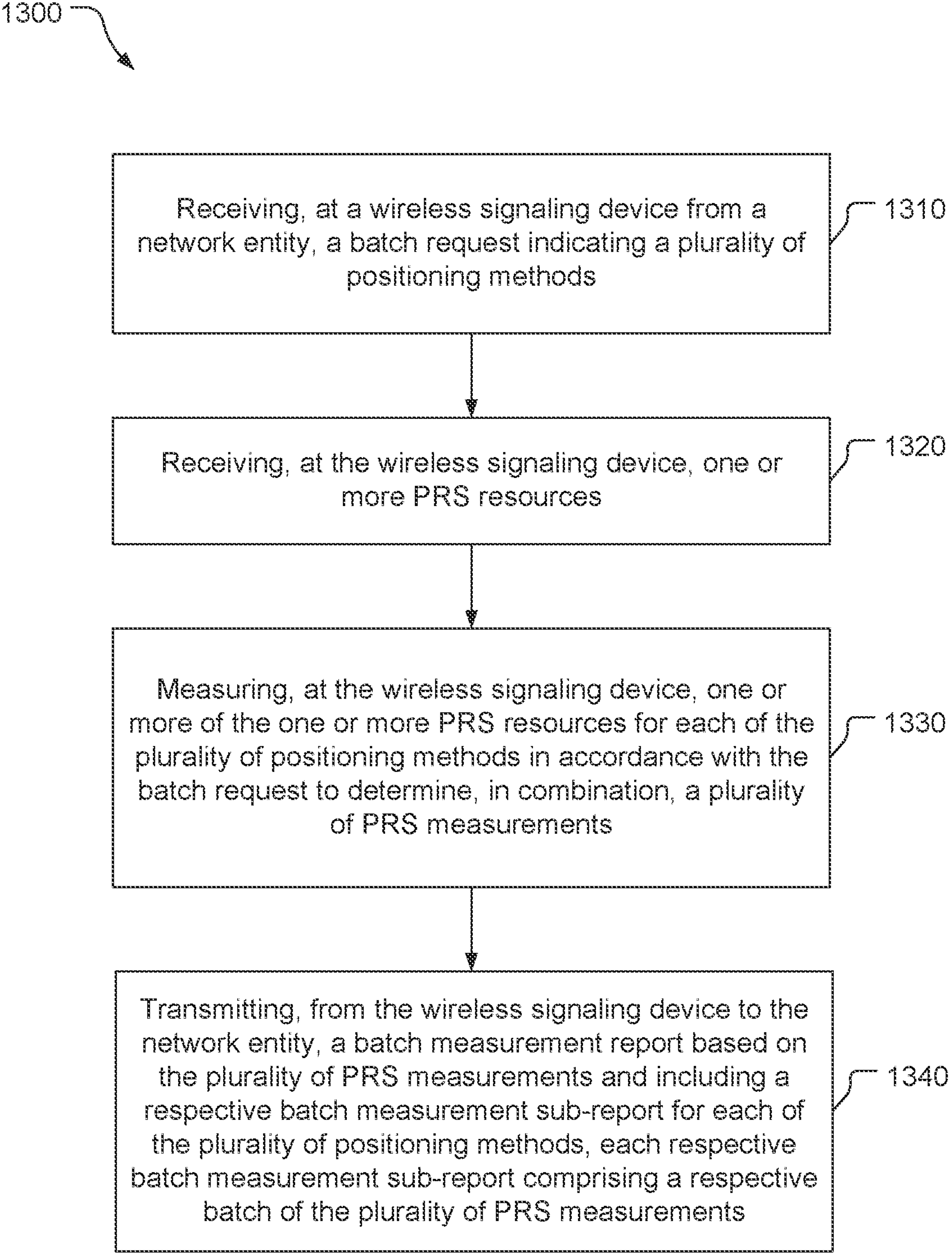
FIG. 13 is a block flow diagram of a batch measurement reporting method.

Referring to FIG. 13, with further reference to FIGS. 1-12, a batch measurement reporting method 1300 includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes receiving, at a wireless signaling device from a network entity, a batch request indicating a plurality of positioning methods (and possibly one or more common batch configuration parameters). For example, the signaling device 701 receives the AD 725 including indications of positioning methods (and one or more corresponding common batch configuration parameters, e.g., the common batching method IE 1010 and the common batching report 1020). The processor 510, possibly in combination with the memory 530, in combination with the transceiver 520 (e.g., the antenna 246 and the wireless receiver 244, or the wired receiver 254, or the antenna 346 and the wireless receiver 344, or the wired receiver 354) may comprise means for receiving the batch request.

At stage 1320, the method 1300 includes receiving, at the wireless signaling device, one or more PRS resources. For example, the signaling device 701 receives the DL-PRS 731, the PRS 732, and/or the PRS 733 at stage 730. The processor 510, possibly in combination with the memory 530, in combination with the transceiver 520 (e.g., the antenna 246 and the wireless receiver 244, or the antenna 346 and the wireless receiver 344) may comprise means for receiving one or more PRS resources.

At stage 1330, the method 1300 includes measuring, at the wireless signaling device, one or more of the one or more PRS resources for each of the plurality of positioning methods in accordance with the batch request (e.g., at least the one or more common batch configuration parameters) to determine, in combination, a plurality of PRS measurements. For example, at stage 740, the signaling device 701 measures one or more PRS resources, of the received PRS, based on positioning method and possibly the common batch configuration parameters (e.g., which PRS resource(s) to measure, which PRS instances from which to measure one or more PRS resources, a measurement periodicity, etc.). The processor 510, possibly in combination with the memory 530, may comprise means for measuring one or more of the one or more PRS resources.

At stage 1340, the method 1300 includes transmitting, from the wireless signaling device to the network entity, a batch measurement report based on the plurality of PRS measurements and including a respective batch measurement sub-report for each of the plurality of positioning methods, each respective batch measurement sub-report comprising a respective batch of the plurality of PRS measurements. For example, the signaling device 701 transmits the batch measurement report 751 to the network device 704, including respective batches of measurements for respective positioning methods for which location information was requested. The processor 510, possibly in combination with the memory 530, in combination with the transceiver 520 (e.g., the antenna 246 and the wireless transmitter 242, or the wired transmitter 252, or the antenna 346 and the wireless transmitter 342, or the wired transmitter 352) may comprise means for transmitting a batch measurement report.

Implementations of the method 1300 may include one or more of the following features. In an example implementation, measuring one or more of the one or more PRS resources comprises measuring one or more of the one or more PRS resources in accordance with one or more respective positioning-method-specific configuration parameters for each of the plurality of positioning methods for which the one or more respective positioning-method-specific configuration parameters are included in the batch request. For example, the signaling device 701 measures PRS resources in accordance with the appropriate individual method configurations 1030 corresponding to the positioning methods for which measurements are requested. In another example implementation, the batch request comprises one or more common batch configuration parameters, and measuring one or more of the one or more PRS resources comprises measuring the one or more of the one or more PRS resources in accordance with at least the one or more common batch configuration parameters, and the one or more common batch configuration parameters comprise a measurement window, or a first indication of the one or more PRS resources, or a second indication of one or more PRS instances of the one or more PRS resources, or a measurement periodicity, or any combination thereof. In another example implementation the batch request comprises one or more first common batch configuration parameters, and measuring one or more of the one or more PRS resources comprises measuring the one or more of the one or more PRS resources in accordance with at least the one or more first common batch configuration parameters, and: the plurality of positioning methods is a first plurality of positioning methods; the one or more PRS resources comprise one or more first PRS resources; the one or more first common batch configuration parameters include a first measurement window corresponding to the first plurality of positioning methods: the batch request further comprises one or more second common batch configuration parameters corresponding to a second plurality of positioning methods and including a second measurement window, the second plurality of positioning methods being different from the first plurality of positioning methods; measuring one or more of the one or more PRS resources comprises measuring the one or more of the one or more first PRS resources that arrive at the wireless signaling device during the first measurement window; and the method 1300 further comprises measuring, in accordance with the one or more second common batch configuration parameters, one or more second PRS resources that arrive at the wireless signaling device during the second measurement window. For example, as shown in, and discussed with respect to, FIG. 12, the signaling device 701 may measure PRS for different combinations of positioning methods in different measurement windows. The processor 510, possibly in combination with the memory 530, may comprise means for measuring the one or more second PRS resources.

Also or alternatively, implementations of the method 1300 may include one or more of the following features. In an example implementation, the method 1300 comprises prioritizing reporting a set of aligned PRS measurements, for different positioning methods, of the plurality of PRS measurements over a non-aligned PRS measurement of the plurality of PRS measurements. For example, the signaling device 701 (e.g., the PRS measurement unit 560 or the processor 310) may respond to being unable to report all PRS measurements by prioritizing reporting of PRS measurements that are aligned in time (e.g., from the same PRS instance) and correspond to multiple different positioning methods over one or more non-aligned PRS measurements (e.g., measurement(s) from a PRS instance for one positioning method where there is no PRS measurement from the same PRS instance for another positioning method). As an illustrative example, assume that the wireless signaling device 500 receives a batch reporting configuration for reporting PRS measurements for two different positioning methods for three PRS instances, instance 1, instance 2, and instance 3. For instance 1, the wireless signaling device 500 makes a first RSTD measurement and a first Rx-Tx measurement for a TDOA method and an RTT method, respectively. For instance 2, the wireless signaling device 500 makes a second RSTD measurement and a second Rx-Tx measurement for the TDOA method and the RTT method, respectively. For instance 3, the wireless signaling device 500 makes a third RSTD measurement for the TDOA method (without making a third Rx-Tx measurement for the RTT method). In this example, implementing the prioritizing of aligned measurements over non-aligned measurements, the wireless signaling device 500 prioritizes reporting of the first and second RSTD measurements and the first and second Rx-Tx measurements over reporting the third RSTD measurement. The processor 510, possibly in combination with the memory 530, may comprise means for prioritizing reporting aligned PRS measurements over a non-aligned PRS measurement. In another example implementation, the method 1300 includes prioritizing reporting of the plurality of PRS measurements based on an order of the plurality of positioning methods indicated in the batch reporting request. For example, the signaling device 701 may respond to being unable to report all PRS measurements by prioritizing reporting of PRS measurements to match an order of positioning methods indicated in the location information request in the AD 725, thus treating the first-listed positioning method as the highest-priority positioning method and assigning a highest priority for reporting PRS measurements to the PRS measurements for that positioning method, and so on. The processor 510, possibly in combination with the memory 530, may comprise means for prioritizing reporting of PRS measurements based on an order of positioning methods indicated in a batch reporting request.

Figure 14:
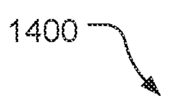
FIG. 14 is a block flow diagram of a method of obtaining a batch report.

Referring to FIG. 14, with further reference to FIGS. 1-12, a method 1400 of obtaining a batch report includes the stages shown. The method 1400 is, however, an example and not limiting. The method 1400 may be altered, e.g., by having stages added, removed, rearranged, combined, performed concurrently, and/or having single stages split into multiple stages.

At stage 1410, the method 1400 includes transmitting, from the apparatus to a wireless signaling device, a batch request indicating a plurality of positioning methods (and possibly one or more common batch configuration parameters) in accordance with which the wireless signaling device is to measure PRS resources (positioning reference signal resources) for batch reporting for each of the plurality of positioning methods. For example, at stage 720 the network device 704 (e.g., the PRS measurement/report requesting unit 470) transmits a location information request in the AD 725 to the signaling device 701. The location information request indicates positioning methods and possibly one or more batch configuration parameters, e.g., the common batching report IE 1020, that the signaling device 701 may use in order to determine PRS measurements for multiple positioning methods. For example, the signaling device 701 (e.g., the PRS measurement unit 560 if the signaling device 701 is a UE, or the processor 310 if the signaling device 701 is a TRP) may measure PRS in accordance with positioning method and possibly one or more configuration parameters (e.g., periodicity, specified PRS instances, and/or specified PRS resource(s), etc.) or may measure PRS to satisfy the configuration parameters (e.g., QoS). The network device 704 may determine the configuration parameters to transmit to the signaling device 701 based on one or more factors. e.g., the positioning methods most likely to provide adequate positioning accuracy. The processor 410, possibly in combination with the memory 411, in combination with the transceiver 415 (e.g., the wired transmitter 452, or the wireless transmitter 442 and the antenna 446) may comprise means for transmitting the batch request.

At stage 1420, the method 1400 includes receiving, at the apparatus, a batch report comprising a respective batch of PRS measurements for each of the plurality of positioning methods. For example, at stage 750 the network device receives the batch measurement report 751 that includes PRS measurements in accordance with the batch request. The processor 410, possibly in combination with the memory 411, in combination with the transceiver 415 (e.g., the wired receiver 454, or the wireless receiver 444 and the antenna 446) may comprise means for receiving a batch report.

Implementations of the method 1400 may include one or more of the following features. In an example implementation, transmitting the batch request comprises transmitting the batch request to include one or more respective positioning-method-specific configuration parameters for one or more of the plurality of positioning methods. For example, the network device 704 transmits the appropriate configuration(s) 1030 for the signaling device 701 to use to determine PRS measurements for the processing methods, to the extent that one or more parameters in addition to the common batching report IE 1020 are appropriate. The processor 410, possibly in combination with the memory 411, in combination with the transceiver 415 (e.g., the wired transmitter 452, or the wireless transmitter 442 and the antenna 446) may comprise means for transmitting the batch request to include one or more respective positioning-method-specific configuration parameters. In another example implementation, the batch request further indicates one or more common batch configuration parameters that comprise a measurement window, or a first indication of the PRS resources, or a second indication of one or more PRS instances of the PRS resources, or a measurement periodicity, or any combination thereof. In another example implementation: the plurality of positioning methods is a first plurality of positioning methods; the batch request further indicates one or more first common batch configuration parameters including a first measurement window corresponding to the first plurality of positioning methods, and transmitting the batch request comprises transmitting the batch request including one or more second common batch configuration parameters corresponding to a second plurality of positioning methods and including a second measurement window, the second plurality of positioning methods being different from the first plurality of positioning methods. For example, the network device 704 may indicate multiple measurement windows each corresponding to a corresponding set of positioning methods (although the same positioning method may be included the different sets).

Also or alternatively, implementations of the method 1400 may include one or more of the following features. In an example implementation, the method 1400 includes transmitting, from the apparatus to the wireless signaling device, an indication to prioritize reporting a set of aligned PRS measurements of the PRS measurements over a non-aligned PRS measurement of the PRS measurements. For example, the AD 725 may indicate for the signaling device 701 to give higher reporting priority (and thus possibly higher measuring priority) to aligned PRS measurements than to a non-aligned PRS measurement. The network device 704 may indicate for the signaling device 701 to prioritize reporting of PRS measurements in accordance with an order of positioning methods indicated in the location information request, e.g., indicated by the order of the reporting configurations corresponding to the positioning methods. The network device 704 may determine the priority based on one or more factors such as the positioning accuracy and/or QoS that each positioning method is expected to yield. The processor 410, possibly in combination with the memory 411, in combination with the transceiver 415 (e.g., the wired transmitter 452, or the wireless transmitter 442 and the antenna 446) may comprise means for transmitting an indication to prioritize reporting the set of aligned PRS measurements and/or means for transmitting an indication to prioritize reporting of PRS measurements based on the order of the positioning methods indicated in the batch request.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A. B, or C" or a list of "A or B or C" means A, or B. or C, or AB (A and B), or AC (A and C), or BC (B and C), or ABC (i.e., A and B and C), or combinations with more than one feature (e.g., AA, AAB, ABBC, etc.). Thus, a recitation that an item. e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium." "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A wireless signaling device comprising:
a transceiver;
one or more memories; and
one or more processors, communicatively coupled to the transceiver and the one or more memories, configured to:
receive, via the transceiver from a network entity, a batch request indicating a plurality of positioning methods;
receive one or more PRS resources (positioning reference signal resources);
measure one or more of the one or more PRS resources for each of the plurality of positioning methods indicated by the batch request to determine, in combination, a plurality of PRS measurements such that the plurality of PRS measurements are determined in accordance with a same one or more common batch configuration parameters for each positioning method of the plurality of positioning methods, wherein the one or more common batch configuration parameters are indicated by the batch request, and wherein the one or more common batch configuration parameters include at least a measurement window defining a time period during which the one or more of the one or more PRS resources to be measured arrive at the wireless signaling device; and
transmit, via the transceiver to the network entity, a batch measurement report based on the plurality of PRS measurements and including a respective batch measurement sub-report for each of the plurality of positioning methods, each respective batch measurement sub-report comprising a respective batch of the plurality of PRS measurements.

2. The wireless signaling device of claim 1, wherein the one or more processors are configured to measure one or more of the one or more PRS resources in accordance with one or more respective positioning-method-specific configuration parameters for each of the plurality of positioning methods for which the one or more respective positioning-method-specific configuration parameters are included in the batch request.

3. The wireless signaling device of claim 1, wherein the batch request comprises the one or more common batch configuration parameters, and the one or more processors are configured to measure one or more of the one or more PRS resources in accordance with at least the one or more common batch configuration parameters, and wherein the one or more common batch configuration parameters comprise the measurement window, or a first indication of the one or more PRS resources, or a second indication of one or more PRS instances of the one or more PRS resources, or a measurement periodicity, or any combination thereof.

4. The wireless signaling device of claim 1, wherein the batch request comprises one or more first common batch configuration parameters, and the one or more processors are configured to measure one or more of the one or more PRS resources in accordance with at least the one or more first common batch configuration parameters, and wherein:
the plurality of positioning methods is a first plurality of positioning methods;
the one or more PRS resources comprise one or more first PRS resources;
the one or more first common batch configuration parameters include a first measurement window corresponding to the first plurality of positioning methods;
the batch request further comprises one or more second common batch configuration parameters corresponding to a second plurality of positioning methods and including a second measurement window, the second plurality of positioning methods being different from the first plurality of positioning methods; and
the one or more processors are configured to measure the one or more first PRS resources that arrive at the wireless signaling device during the first measurement window and to measure, in accordance with the one or more second common batch configuration parameters, one or more second PRS resources that arrive at the wireless signaling device during the second measurement window.

5. The wireless signaling device of claim 1, wherein the one or more processors are configured to prioritize reporting a set of aligned PRS measurements, for different positioning methods, of the plurality of PRS measurements over a non-aligned PRS measurement of the plurality of PRS measurements.

6. The wireless signaling device of claim 1, wherein the one or more processors are configured to prioritize reporting of the plurality of PRS measurements based on an order of the plurality of positioning methods indicated in the batch reporting request.

7. A wireless signaling device comprising:
means for receiving, from a network entity, a batch request indicating a plurality of positioning methods;
means for receiving one or more PRS resources (positioning reference signal resources);
means for measuring one or more of the one or more PRS resources for each of the plurality of positioning methods indicated by the batch request to determine, in combination, a plurality of PRS measurements such that the plurality of PRS measurements are determined in accordance with a same one or more common batch configuration parameters for each positioning method of the plurality of positioning methods, wherein the one or more common batch configuration parameters are indicated by the batch request, and wherein the one or more common batch configuration parameters include at least a measurement window defining a time period during which the one or more of the one or more PRS resources to be measured arrive at the wireless signaling device; and
means for transmitting, to the network entity, a batch measurement report based on the plurality of PRS measurements and including a respective batch measurement sub-report for each of the plurality of positioning methods, each respective batch measurement sub-report comprising a respective batch of the plurality of PRS measurements.

8. The wireless signaling device of claim 7, wherein the means for measuring one or more of the one or more PRS resources comprise means for measuring one or more of the one or more PRS resources in accordance with one or more respective positioning-method-specific configuration parameters for each of the plurality of positioning methods for which the one or more respective positioning-method-specific configuration parameters are included in the batch request.

9. The wireless signaling device of claim 7, wherein the batch request comprises the one or more common batch configuration parameters, and the means for measuring one or more of the one or more PRS resources comprise means for measuring the one or more of the one or more PRS resources in accordance with at least the one or more common batch configuration parameters, and wherein the one or more common batch configuration parameters comprise the measurement window, or a first indication of the one or more PRS resources, or a second indication of one or more PRS instances of the one or more PRS resources, or a measurement periodicity, or any combination thereof.

10. The wireless signaling device of claim 7, wherein the batch request comprises one or more first common batch configuration parameters, and the means for measuring one or more of the one or more PRS resources comprise means for measuring the one or more of the one or more PRS resources in accordance with at least the one or more first common batch configuration parameters, and wherein:

the plurality of positioning methods is a first plurality of positioning methods;

the one or more PRS resources comprise one or more first PRS resources;

the one or more first common batch configuration parameters include a first measurement window corresponding to the first plurality of positioning methods;

the batch request further comprises one or more second common batch configuration parameters corresponding to a second plurality of positioning methods and including a second measurement window, the second plurality of positioning methods being different from the first plurality of positioning methods;

the means for measuring one or more the one or more PRS resources comprise means for measuring the one or more of the one or more first PRS resources that arrive at the wireless signaling device during the first measurement window; and the wireless signaling device further comprises means for measuring, in accordance with the one or more second common batch configuration parameters, one or more second PRS resources that arrive at the wireless signaling device during the second measurement window.

11. The wireless signaling device of claim 7, further comprising means for prioritizing reporting of a set of aligned PRS measurements, for different positioning methods, of the plurality of PRS measurements over a non-aligned PRS measurement of the plurality of PRS measurements.

12. The wireless signaling device of claim 7, further comprising means for prioritizing reporting of the plurality of PRS measurements based on an order of the plurality of positioning methods indicated in the batch reporting request.

13. A batch measurement reporting method comprising:

receiving, at a wireless signaling device from a network entity, a batch request indicating a plurality of positioning methods;

receiving, at the wireless signaling device, one or more PRS resources (positioning reference signal resources);

measuring, at the wireless signaling device, one or more of the one or more PRS resources for each of the plurality of positioning methods indicated by the batch request to determine, in combination, a plurality of PRS measurements such that the plurality of PRS measurements are determined in accordance with a same one or more common batch configuration parameters for each positioning method of the plurality of positioning methods, wherein the one or more common batch configuration parameters are indicated by the batch request, and wherein the one or more common batch configuration parameters include at least a measurement window defining a time period during which the one or more of the one or more PRS resources to be measured arrive at the wireless signaling device; and transmitting, from the wireless signaling device to the network entity, a batch measurement report based on the plurality of PRS measurements and including a respective batch measurement sub-report for each of the plurality of positioning methods, each respective batch measurement sub-report comprising a respective batch of the plurality of PRS measurements.

14. The method of claim 13, wherein measuring one or more of the one or more PRS resources comprises measuring one or more of the one or more PRS resources in accordance with one or more respective positioning-method-specific configuration parameters for each of the plurality of positioning methods for which the one or more respective positioning-method-specific configuration parameters are included in the batch request.

15. The method of claim 13, wherein the batch request comprises the one or more common batch configuration parameters, and measuring one or more of the one or more PRS resources comprises measuring the one or more of the one or more PRS resources in accordance with at least the one or more common batch configuration parameters, and wherein the one or more common batch configuration parameters comprise the measurement window, or a first indication of the one or more PRS resources, or a second indication of one or more PRS instances of the one or more PRS resources, or a measurement periodicity, or any combination thereof.

16. The method of claim 13, wherein the batch request comprises one or more first common batch configuration parameters, and measuring one or more of the one or more PRS resources comprises measuring the one or more of the one or more PRS resources in accordance with at least the one or more first common batch configuration parameters, and wherein:

the plurality of positioning methods is a first plurality of positioning methods;

the one or more PRS resources comprise one or more first PRS resources;

the one or more first common batch configuration parameters include a first measurement window corresponding to the first plurality of positioning methods;

the batch request further comprises one or more second common batch configuration parameters corresponding to a second plurality of positioning methods and including a second measurement window, the second plurality of positioning methods being different from the first plurality of positioning methods;

measuring one or more of the one or more PRS resources comprises measuring the one or more of the one or more first PRS resources that arrive at the wireless signaling device during the first measurement window; and the method further comprises measuring, in accordance with the one or more second common batch configuration parameters, one or more second PRS resources that arrive at the wireless signaling device during the second measurement window.

17. The method of claim 13, further comprising prioritizing reporting a set of aligned PRS measurements, for different positioning methods, of the plurality of PRS measurements over a non-aligned PRS measurement of the plurality of PRS measurements.

18. The method of claim 13, further comprising prioritizing reporting of the plurality of PRS measurements based on an order of the plurality of positioning methods indicated in the batch reporting request.

19. A non-transitory, processor-readable storage medium comprising processor-readable instructions to cause one or more processors of a wireless signaling device to:

receive, from a network entity, a batch request indicating a plurality of positioning methods;

receive one or more PRS resources (positioning reference signal resources);

measure one or more of the one or more PRS resources for each of the plurality of positioning methods indicated by the batch request to determine, in combination, a plurality of PRS measurements such that the plurality of PRS measurements are determined in accordance with a same one or more common batch configuration parameters for each positioning method of the plurality of positioning methods, wherein the one or more common batch configuration parameters are indicated by the batch request, and wherein the one or more common batch configuration parameters include at least a measurement window defining a time period during which the one or more of the one or more PRS resources to be measured arrive at the wireless signaling device; and transmit, to the network entity, a batch measurement report based on the plurality of PRS measurements and including a respective batch measurement sub-report for each of the plurality of positioning methods, each respective batch measurement sub-report comprising a respective batch of the plurality of PRS measurements.

20. The storage medium of claim 19, wherein the processor-readable instructions to cause the one or more processors to measure one or more of the one or more PRS resources comprise processor-readable instructions to cause the one or more processors to measure one or more of the one or more PRS resources in accordance with one or more respective positioning-method-specific configuration parameters for each of the plurality of positioning methods for which the one or more respective positioning-method-specific configuration parameters are included in the batch request.

21. The storage medium of claim 19, wherein the batch request comprises the one or more common batch configuration parameters, and the processor-readable instructions to cause the one or more processors to measure one or more of the one or more PRS resources comprise processor-readable instructions to cause the one or more processors to measure the one or more of the one or more PRS resources in accordance with at least the one or more common batch configuration parameters, and wherein the one or more common batch configuration parameters comprise the measurement window, or a first indication of the one or more PRS resources, or a second indication of one or more PRS instances of the one or more PRS resources, or a measurement periodicity, or any combination thereof.

22. The storage medium of claim 19, wherein the batch request comprises one or more first common batch configuration parameters, and the processor-readable instructions to cause the one or more processors to measure one or more of the one or more PRS resources comprise processor-readable instructions to cause the one or more processors to measure the one or more of the one or more PRS resources in accordance with at least the one or more first common batch configuration parameters, and wherein:

the plurality of positioning methods is a first plurality of positioning methods;

the one or more PRS resources comprise one or more first PRS resources;

the one or more first common batch configuration parameters include a first measurement window corresponding to the first plurality of positioning methods;

the batch request further comprises one or more second common batch configuration parameters corresponding to a second plurality of positioning methods and including a second measurement window, the second plurality of positioning methods being different from the first plurality of positioning methods;

the processor-readable instructions to cause the one or more processors to measure one or more of the one or more PRS resources comprise processor-readable instructions to cause the one or more processors to measure the one or more of the one or more first PRS resources that arrive at the wireless signaling device during the first measurement window; and the storage medium further comprises processor-readable instructions to cause the one or more processors to measure, in accordance with the one or more second common batch configuration parameters, one or more second PRS resources that arrive at the wireless signaling device during the second measurement window.

23. The storage medium of claim 19, further comprising processor-readable instructions to cause the one or more processors to prioritize reporting a set of aligned PRS measurements, for different positioning methods, of the plurality of PRS measurements over a non-aligned PRS measurement of the plurality of PRS measurements.

24. The storage medium of claim 19, further comprising processor-readable instructions to cause the one or more processors to prioritize reporting of the plurality of PRS measurements based on an order of the plurality of positioning methods indicated in the batch reporting request.

25. An apparatus comprising:

a transceiver;

one or more memories; and one or more processors, communicatively coupled to the transceiver and the one or more memories, configured to:

transmit, via the transceiver to a wireless signaling device, a batch request indicating a plurality of positioning methods in accordance with which the wireless signaling device is to measure PRS resources (positioning reference signal resources) using a same one or more common batch configuration parameters for each positioning method of the plurality of positioning methods, for batch reporting for each of the plurality of positioning methods, wherein the one or more common batch configuration parameters are indicated by the batch request, and wherein the one or more common batch configuration parameters include at least a measurement window defining a time period during which the PRS resources to be measured arrive at the wireless signaling device; and receive a batch report comprising a respective batch of PRS measurements for each of the plurality of positioning methods.

26. The apparatus of claim 25, wherein the one or more processors are configured to transmit the batch request to include one or more respective positioning-method-specific configuration parameters for one or more of the plurality of positioning methods.

27. The apparatus of claim 25, wherein the batch request further indicates the one or more common batch configuration parameters that comprise the measurement window, or a first indication of the PRS resources, or a second indication of one or more PRS instances of the PRS resources, or a measurement periodicity, or any combination thereof.

28. The apparatus of claim 25, wherein:

the plurality of positioning methods is a first plurality of positioning methods;

the batch request indicates one or more first common batch configuration parameters including a first measurement window corresponding to the first plurality of positioning methods; and the one or more processors are configured to transmit the batch request including one or more second common batch configuration parameters corresponding to a second plurality of positioning methods and including a second measurement window, the second plurality of positioning methods being different from the first plurality of positioning methods.

29. The apparatus of claim 25, wherein the one or more processors are configured to transmit, via the transceiver to the wireless signaling device, an indication to prioritize reporting a set of aligned PRS measurements of the PRS measurements over a non-aligned PRS measurement of the PRS measurements.

30. The apparatus of claim 25, wherein the one or more processors are configured to transmit, via the transceiver to the wireless signaling device, an indication to prioritize reporting of the PRS measurements based on an order of the plurality of positioning methods indicated in the batch request.

31. An apparatus comprising:

means for transmitting, to a wireless signaling device, a batch request indicating a plurality of positioning methods in accordance with which the wireless signaling device is to measure PRS resources (positioning reference signal resources) using a same one or more common batch configuration parameters for each positioning method of the plurality of positioning methods, for batch reporting for each of the plurality of positioning methods, wherein the one or more common batch configuration parameters are indicated by the batch request, and wherein the one or more common batch configuration parameters include at least a measurement window defining a time period during which the PRS resources to be measured arrive at the wireless signaling device; and means for receiving a batch report comprising a respective batch of PRS measurements for each of the plurality of positioning methods.

32. The apparatus of claim 31, wherein the means for transmitting the batch request comprise means for transmitting the batch request to include one or more respective positioning-method-specific configuration parameters for one or more of the plurality of positioning methods.

33. The apparatus of claim 31, wherein the batch request further indicates the one or more common batch configuration parameters that comprise the measurement window, or a first indication of the PRS resources, or a second indication of one or more PRS instances of the PRS resources, or a measurement periodicity, or any combination thereof.

34. The apparatus of claim 31, wherein:

the plurality of positioning methods is a first plurality of positioning methods;

the batch request indicates one or more first common batch configuration parameters including a first measurement window corresponding to the first plurality of positioning methods; and the means for transmitting the batch request comprise means for transmitting the batch request including one or more second common batch configuration parameters corresponding to a second plurality of positioning methods and including a second measurement window, the second plurality of positioning methods being different from the first plurality of positioning methods.

35. The apparatus of claim 31, further comprising means for transmitting, to the wireless signaling device, an indication to prioritize reporting a set of aligned PRS measurements of the PRS measurements over a non-aligned PRS measurement of the PRS measurements.

36. The apparatus of claim 31, further comprising means for transmitting, to the wireless signaling device, an indication to prioritize reporting of the PRS measurements based on an order of the plurality of positioning methods indicated in the batch request.

37. A method of obtaining a batch report, the method comprising:

transmitting, from an apparatus to a wireless signaling device, a batch request indicating a plurality of positioning methods in accordance with which the wireless signaling device is to measure PRS resources (positioning reference signal resources) or using a same one or more common batch configuration parameters for each positioning method of the plurality of positioning methods, for batch reporting for each of the plurality of positioning methods, wherein the one or more common batch configuration parameters are indicated by the batch request, and wherein the one or more common batch configuration parameters include at least a measurement window defining a time period during which the PRS resources to be measured arrive at the wireless signaling device; and receiving, at the apparatus, the batch report comprising a respective batch of PRS measurements for each of the plurality of positioning methods.

38. The method of claim 37, wherein transmitting the batch request comprises transmitting the batch request to include one or more respective positioning-method-specific configuration parameters for one or more of the plurality of positioning methods.

39. The method of claim 37, wherein the batch request further indicates the one or more common batch configuration parameters that comprise the measurement window, or a first indication of the PRS resources, or a second indication of one or more PRS instances of the PRS resources, or a measurement periodicity, or any combination thereof.

40. The method of claim 37, wherein:

the plurality of positioning methods is a first plurality of positioning methods;

the batch request indicates one or more first common batch configuration parameters including a first measurement window corresponding to the first plurality of positioning methods; and transmitting the batch request comprises transmitting the batch request including one or more second common batch configuration parameters corresponding to a second plurality of positioning methods and including a second measurement window, the second plurality of positioning methods being different from the first plurality of positioning methods.

41. The method of claim 37, further comprising transmitting, from the apparatus to the wireless signaling device, an indication to prioritize reporting a set of aligned PRS measurements of the PRS measurements over a non-aligned PRS measurement of the PRS measurements.

42. The method of claim 37, further comprising transmitting, from the apparatus to the wireless signaling device, an indication to prioritize reporting of the PRS measurements based on an order of the plurality of positioning methods indicated in the batch request.

43. A non-transitory, processor-readable storage medium comprising processor-readable instructions to cause one or more processors of an apparatus to:

transmit, to a wireless signaling device, a batch request indicating a plurality of positioning methods in accordance with which the wireless signaling device is to measure PRS resources (positioning reference signal resources) using a same one or more common batch configuration parameters for each positioning method of the plurality of positioning methods, for batch reporting for each of the plurality of positioning methods, wherein the one or more common batch configuration parameters are indicated by the batch request, and wherein the one or more common batch configuration parameters include at least a measurement window defining a time period during which the PRS resources to be measured arrive at the wireless signaling device; and receive a batch report comprising a respective batch of PRS measurements for each of the plurality of positioning methods.

44. The storage medium of claim 43, wherein the processor-readable instructions to cause the one or more processors to transmit the batch request comprise processor-readable instructions to cause the processor to transmit the batch request to include one or more respective positioning-method-specific configuration parameters for one or more of the plurality of positioning methods.

45. The storage medium of claim 43, wherein the batch request further indicates the one or more common batch configuration parameters that comprise the measurement window, or a first indication of the PRS resources, or a second indication of one or more PRS instances of the PRS resources, or a measurement periodicity, or any combination thereof.

46. The storage medium of claim 43, wherein:

the plurality of positioning methods is a first plurality of positioning methods;

the batch request indicates one or more first common batch configuration parameters including a first measurement window corresponding to the first plurality of positioning methods; and the processor-readable instructions to cause the one or more processors to transmit the batch request comprise processor-readable instructions to cause the one or more processors to transmit the batch request including one or more second common batch configuration parameters corresponding to a second plurality of positioning methods and including a second measurement window, the second plurality of positioning methods being different from the first plurality of positioning methods.

47. The storage medium of claim 43, further comprising processor-readable instructions to cause the one or more processors to transmit, to the wireless signaling device, an indication to prioritize reporting a set of aligned PRS measurements of the PRS measurements over a non-aligned PRS measurement of the PRS measurements.

48. The storage medium of claim 43, further comprising processor-readable instructions to cause the one or more processors to transmit, to the wireless signaling device, an indication to prioritize reporting of the PRS measurements based on an order of the plurality of positioning methods indicated in the batch request.

* * * * *